United States Patent
Molnar et al.

(10) Patent No.: US 7,053,893 B1
(45) Date of Patent: May 30, 2006

(54) POSITION CONFLICT DETECTION AND AVOIDANCE IN A PROGRAMMABLE GRAPHICS PROCESSOR USING TILE COVERAGE DATA

(75) Inventors: Steven E. Molnar, Chapel Hill, NC (US); John S. Montrym, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/737,418

(22) Filed: Dec. 15, 2003

(51) Int. Cl.
*G06T 15/50* (2006.01)

(52) U.S. Cl. .................. 345/426; 345/423; 345/544; 345/564; 345/582; 345/614; 345/626

(58) Field of Classification Search ............... 345/475, 345/543, 544, 556, 614, 626
See application file for complete search history.

(56) References Cited

U.S. PATENT DOCUMENTS

| | | | |
|---|---|---|---|
| 6,204,856 B1* | 3/2001 | Wood et al. | 345/608 |
| 6,323,860 B1* | 11/2001 | Zhu et al. | 345/427 |
| 6,704,024 B1* | 3/2004 | Robotham et al. | 345/581 |
| 6,717,576 B1* | 4/2004 | Duluk et al. | 345/419 |
| 6,847,370 B1* | 1/2005 | Baldwin et al. | 345/564 |
| 2003/0115267 A1* | 6/2003 | Hinton | 709/204 |
| 2003/0164830 A1* | 9/2003 | Kent | 345/505 |
| 2004/0212619 A1* | 10/2004 | Saito et al. | 345/441 |

OTHER PUBLICATIONS

Aila et al., "Delay Streams for Graphics Hardware," ACM Transactions on Graphics (TOG), Proceedings from SIGGRAPH 2003, (Jul. 2003). vol. 22, Issue 3. pp. 792-800.*

* cited by examiner

*Primary Examiner*—Richard Hjerpe
*Assistant Examiner*—Antonio Caschera
(74) *Attorney, Agent, or Firm*—Patterson & Sheridan, LLP

(57) ABSTRACT

Prior to executing a program on a fragment, a conflict detection unit, within a fragment processor checks if there is a position conflict indicating a RAW (read after write) hazard may exist. A RAW hazard exists when there is a pending write to a destination location that source data will be read from during execution of the program. When the fragment enters a processing pipeline, each destination location that may be written during the processing of the fragment is entered in conflict detection unit. During processing, the conflict detection unit is updated when a pending write to a destination location is completed.

19 Claims, 25 Drawing Sheets

POSITION CONFLICT DETECTION AND AVOIDANCE IN A PROGRAMMABLE GRAPHICS PROCESSOR USING TILE COVERAGE DATA

FIELD OF THE INVENTION

One or more aspects of the invention generally relate to processing graphics data in a programmable graphics processor, and more particularly to writing and reading graphics data associated with a buffer.

BACKGROUND

Current graphics data processing is exemplified by systems and methods developed to perform a specific operation on several graphics data elements, e.g., linear interpolation, tessellation, texture mapping, depth testing. Traditionally graphics processing systems were implemented as fixed function computation units and more recently the computation units are programmable to perform a limited set of operations. Computation units are connected in a "shading pipeline" to perform shading operations. The shading pipeline includes a texture read interface for reading texture data from graphics memory and a write interface for writing graphics data, including texture data to graphics memory. When the texture data is being written to a buffer stored in graphics memory, the buffer may not be read from by the texture read interface until the shading pipeline has been flushed. The shading pipeline is flushed to assure that any pending writes to the buffer are completed before the texture data is read from the buffer by the shading pipeline. Processing throughput of the shading pipeline is reduced whenever a flush instruction is executed.

For the foregoing reasons, it is desirable to write to a buffer and read from the buffer without flushing the shading pipeline between the write and read.

SUMMARY

Various embodiments of a method of the invention include partitioning an image into tiles, each tile associated with a unique tile origin, allocating an entry in at least one storage resource to a tile origin, the entry specified by a tile number, and storing a portion of a position associated with at least one fragment in the entry.

Various embodiments of the invention include a conflict detection unit configured to detect position conflicts. The conflict detection unit includes at least one storage resource including entries configured to store tile origins and coverage mask data and a control unit configured to determine whether or not a position conflict exists within a tile associated with a tile origin stored in the at least one storage resource.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

Figure 2A:
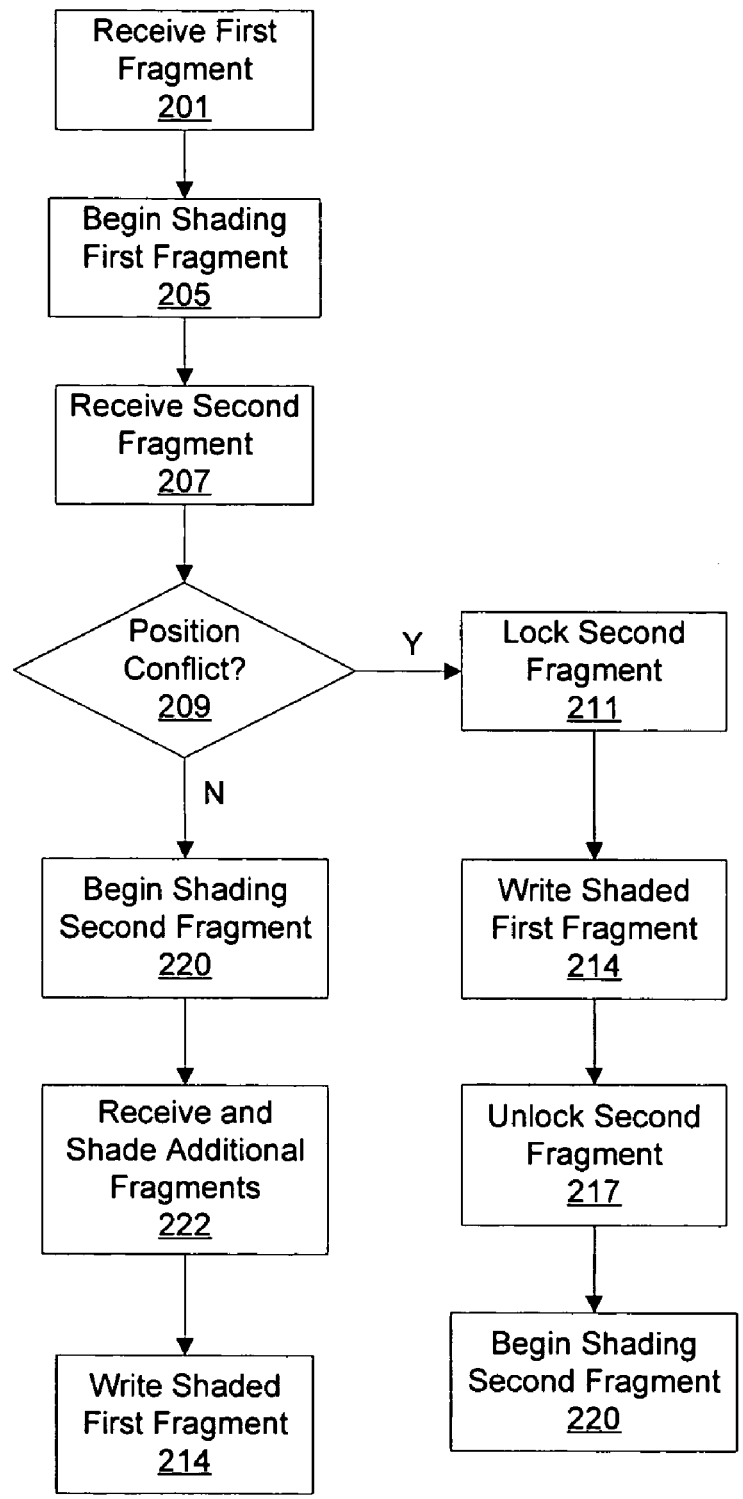
Figure 2B:
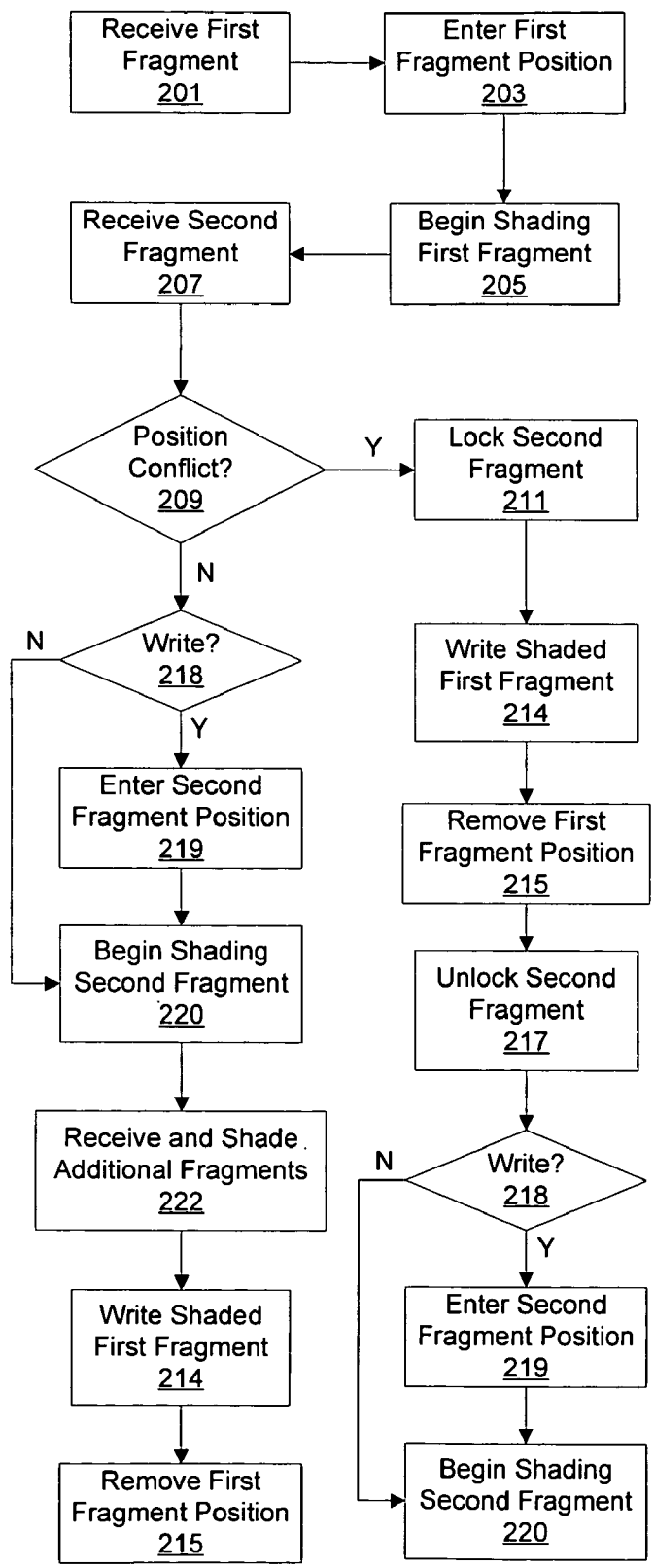
Figure 2C:
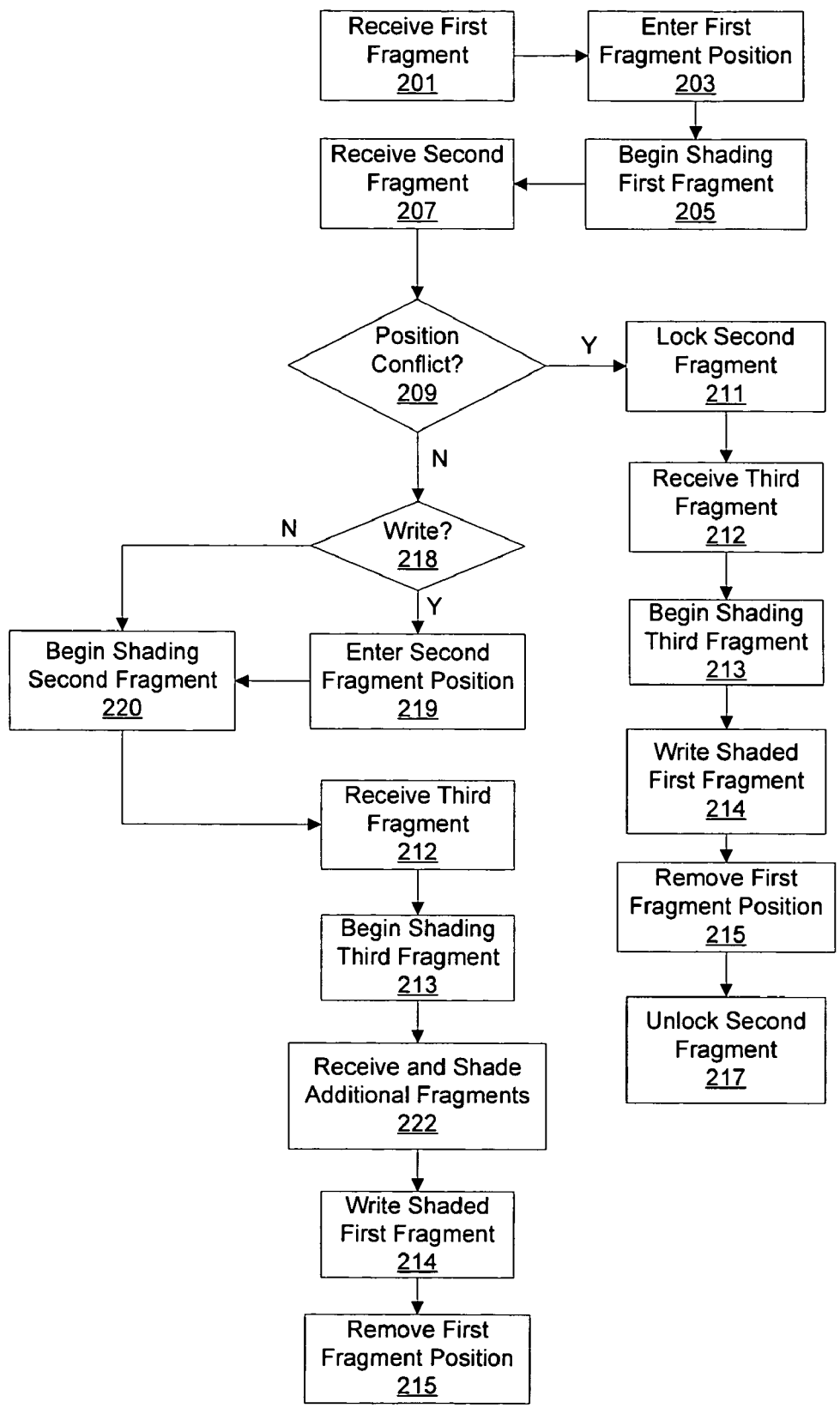

FIGS. 2A, 2B, and 2C illustrate embodiments of methods in accordance with one or more aspects of the present invention.

Figure 3A:
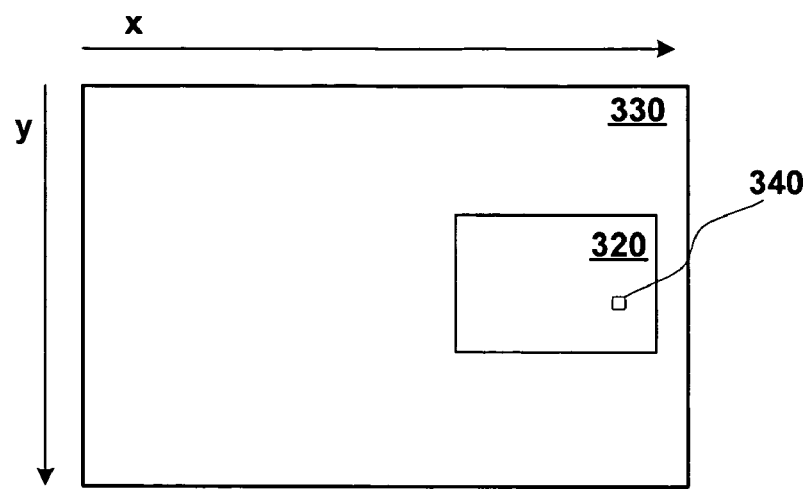

FIG. 3A is a conceptual diagram of a buffer used by a display device.

Figure 3B:
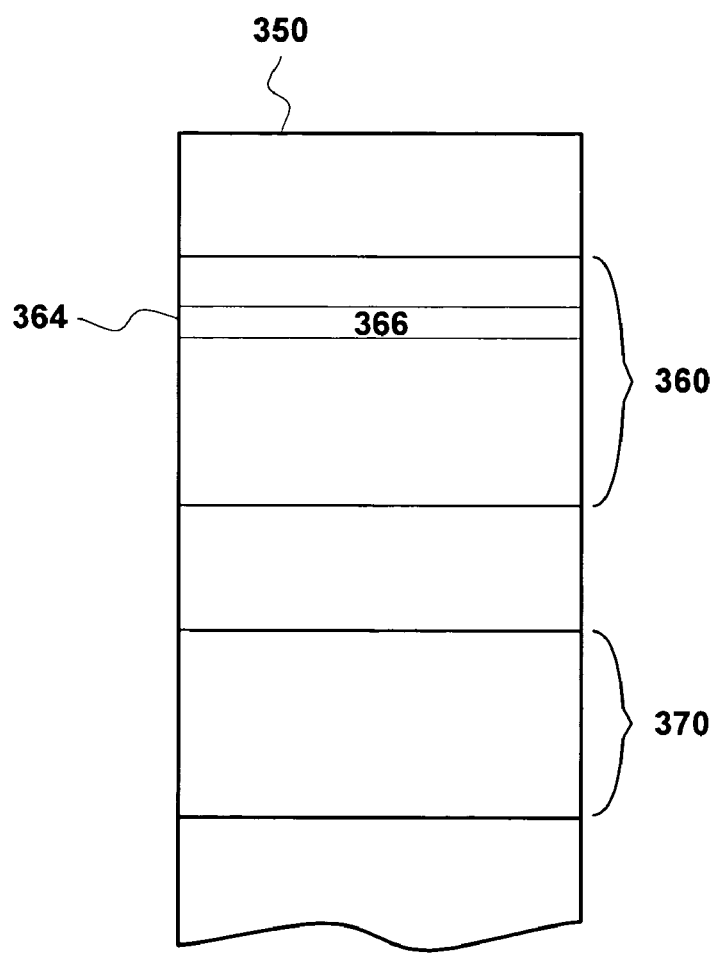

FIG. 3B is a conceptual diagram of buffers stored in graphics memory.

Figure 4A:
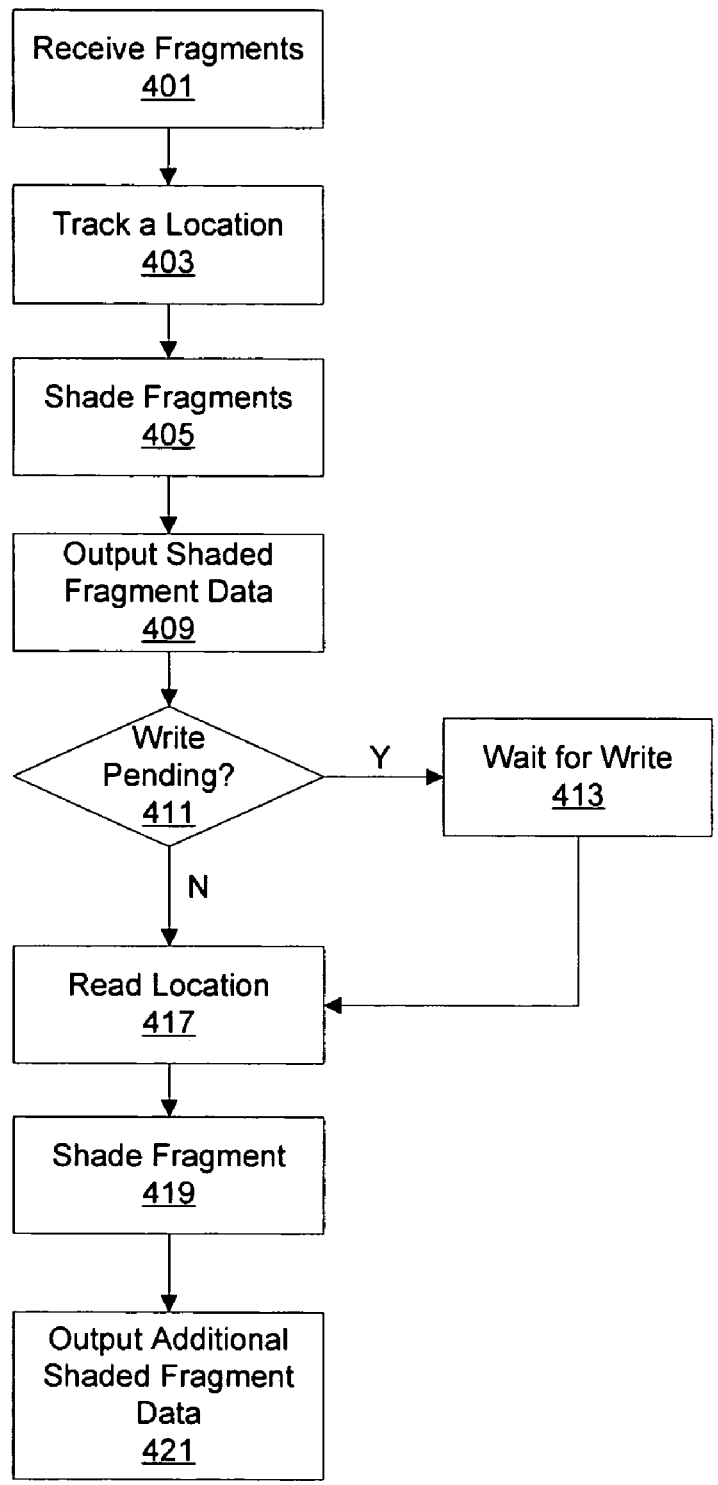
Figure 4B:
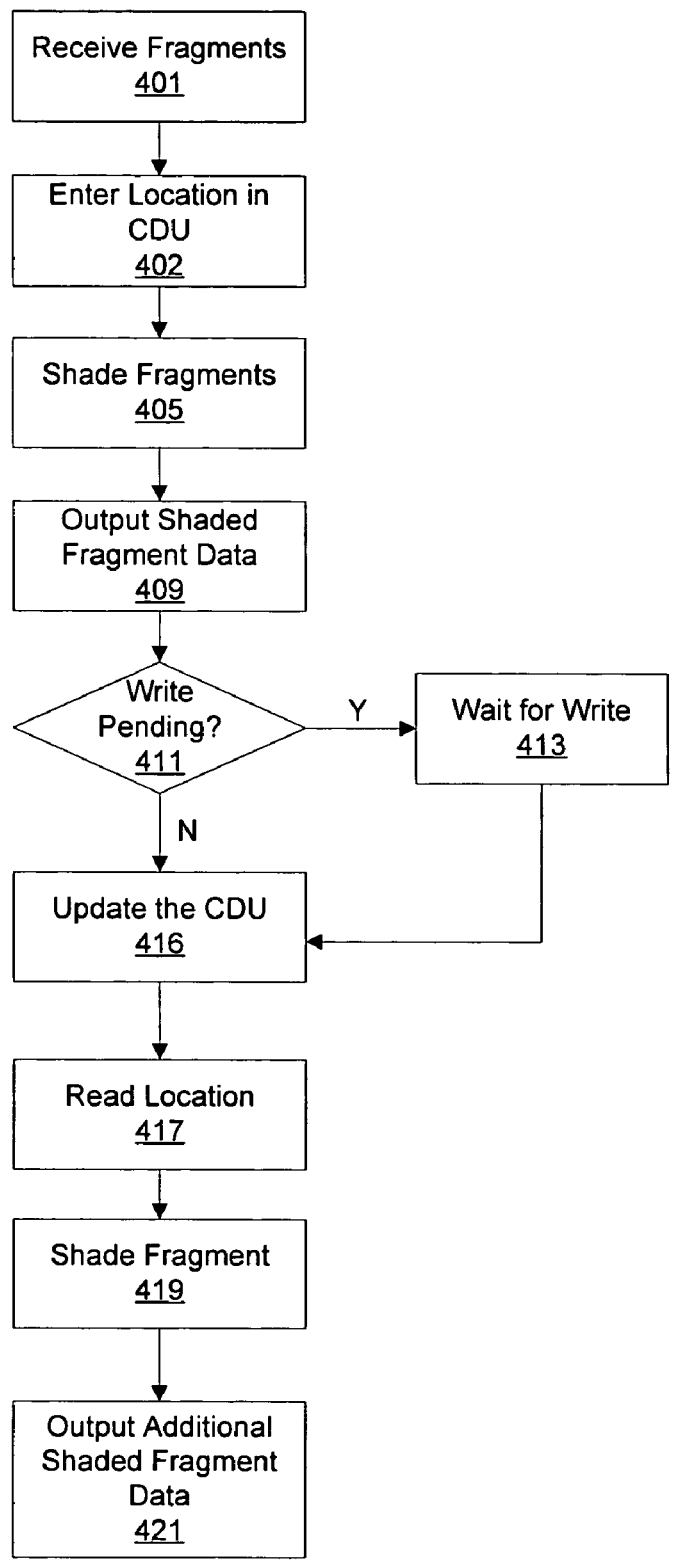

FIGS. 4A and 4B illustrate embodiments of methods in accordance with one or more aspects of the present invention.

Figure 1A:
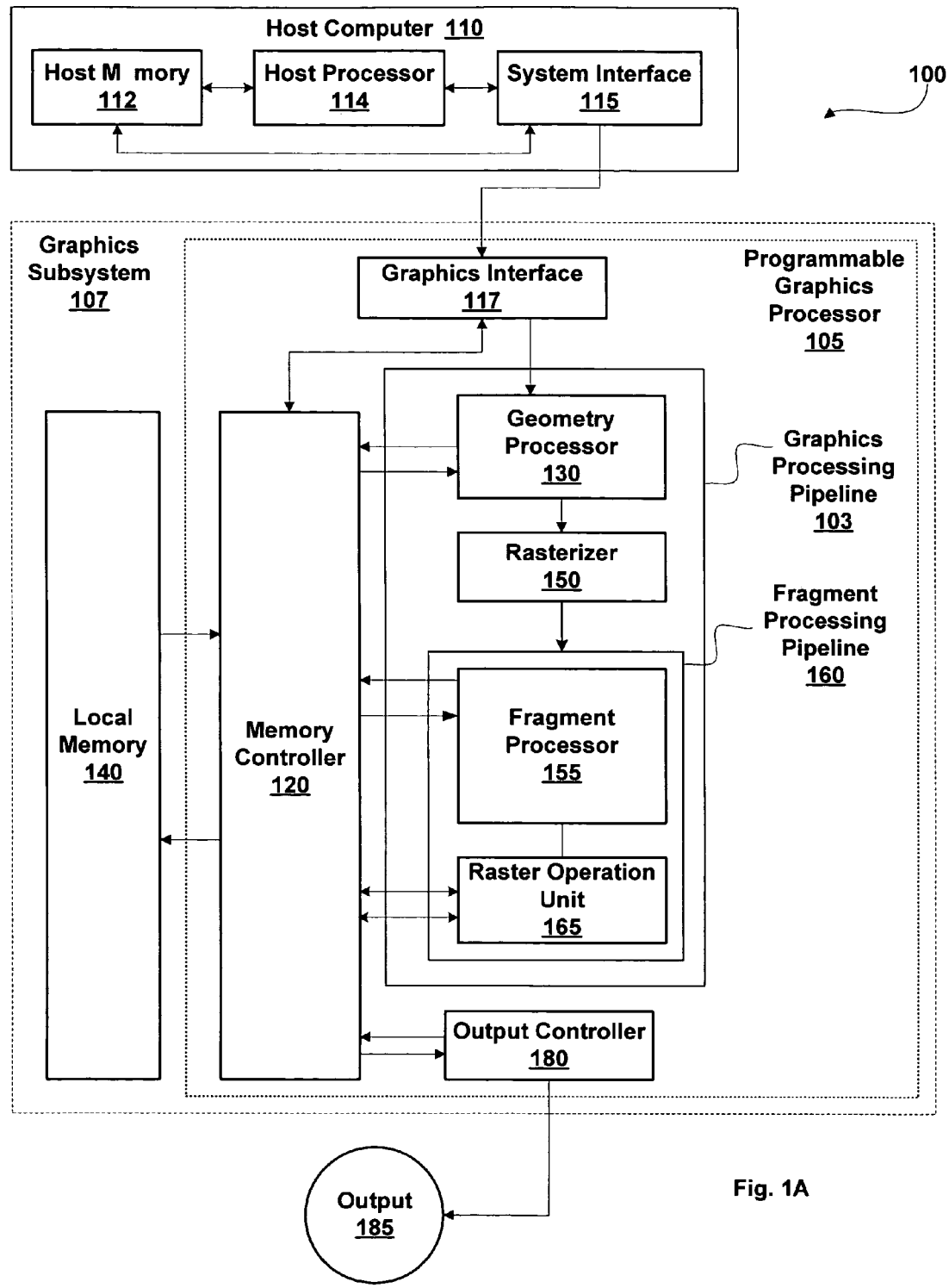
FIG. 1A is a block diagram of an exemplary embodiment of a respective computer system in accordance with one or more aspects of the present invention including a host computer and a graphics subsystem.
Figure 5:
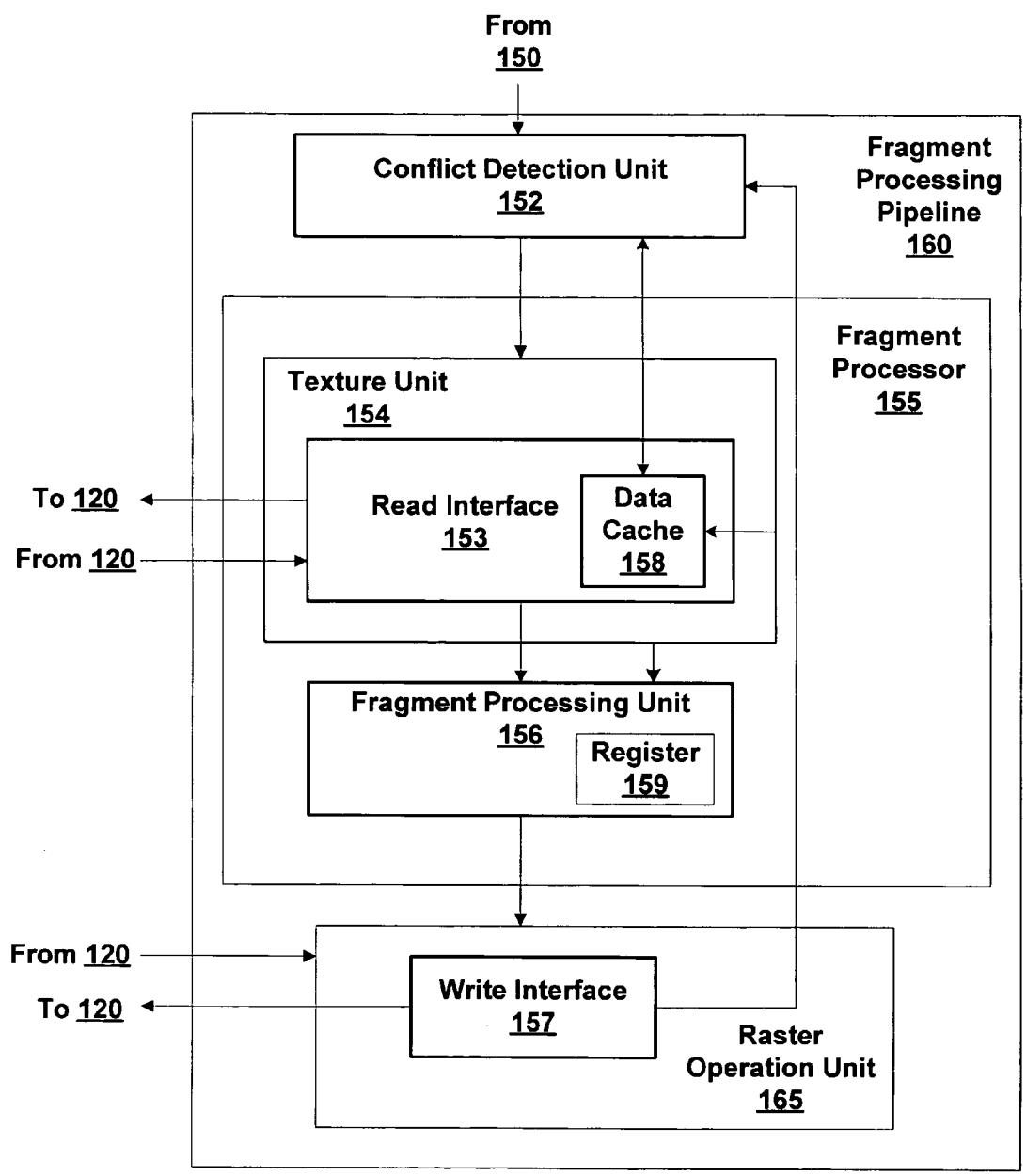

FIG. 5 is a block diagram of an exemplary embodiment of portions of Fragment Processing Pipeline of FIG. 1A in accordance with one or more aspects of the present invention.

Figure 6A:
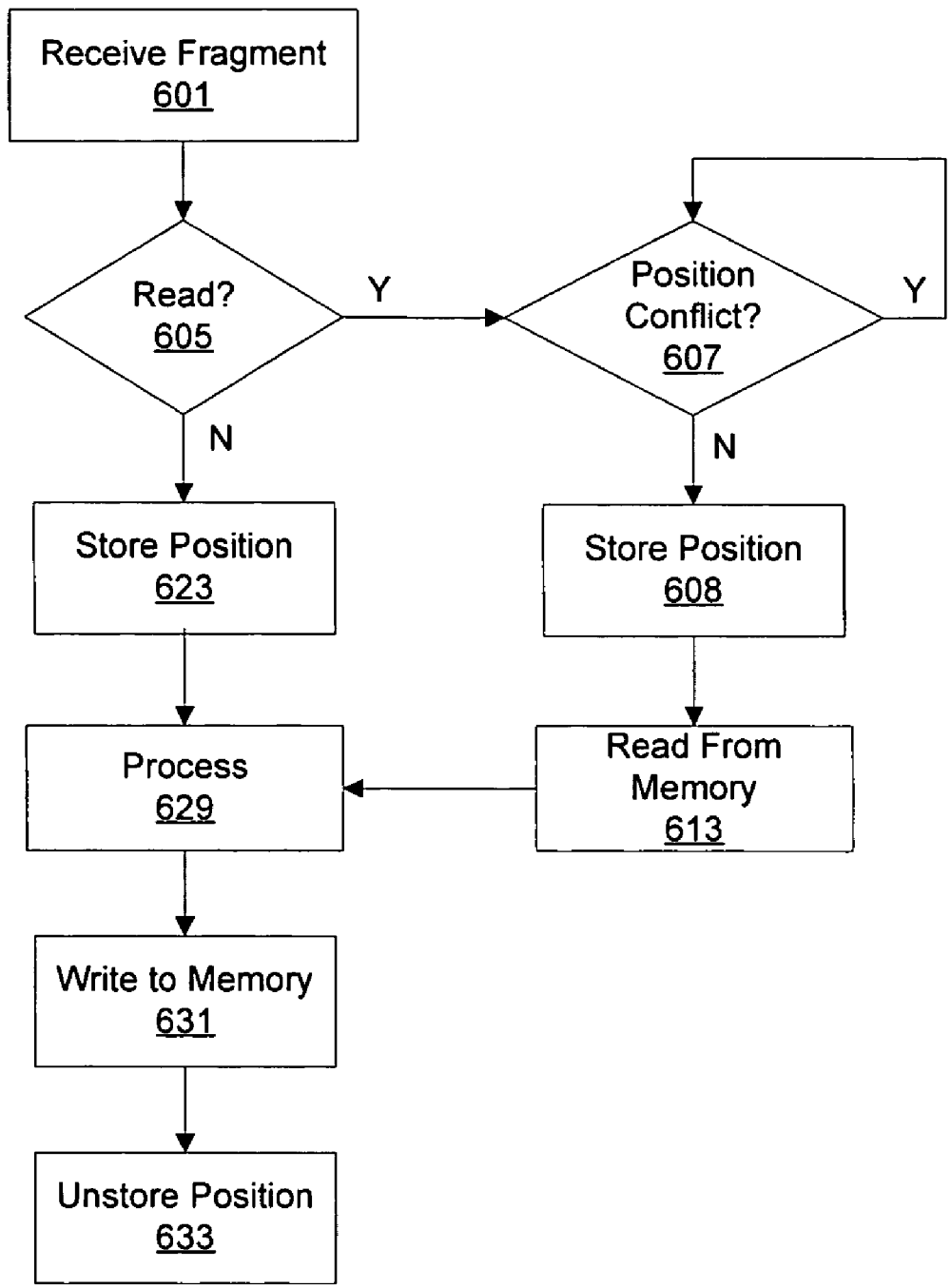
Figure 6B:
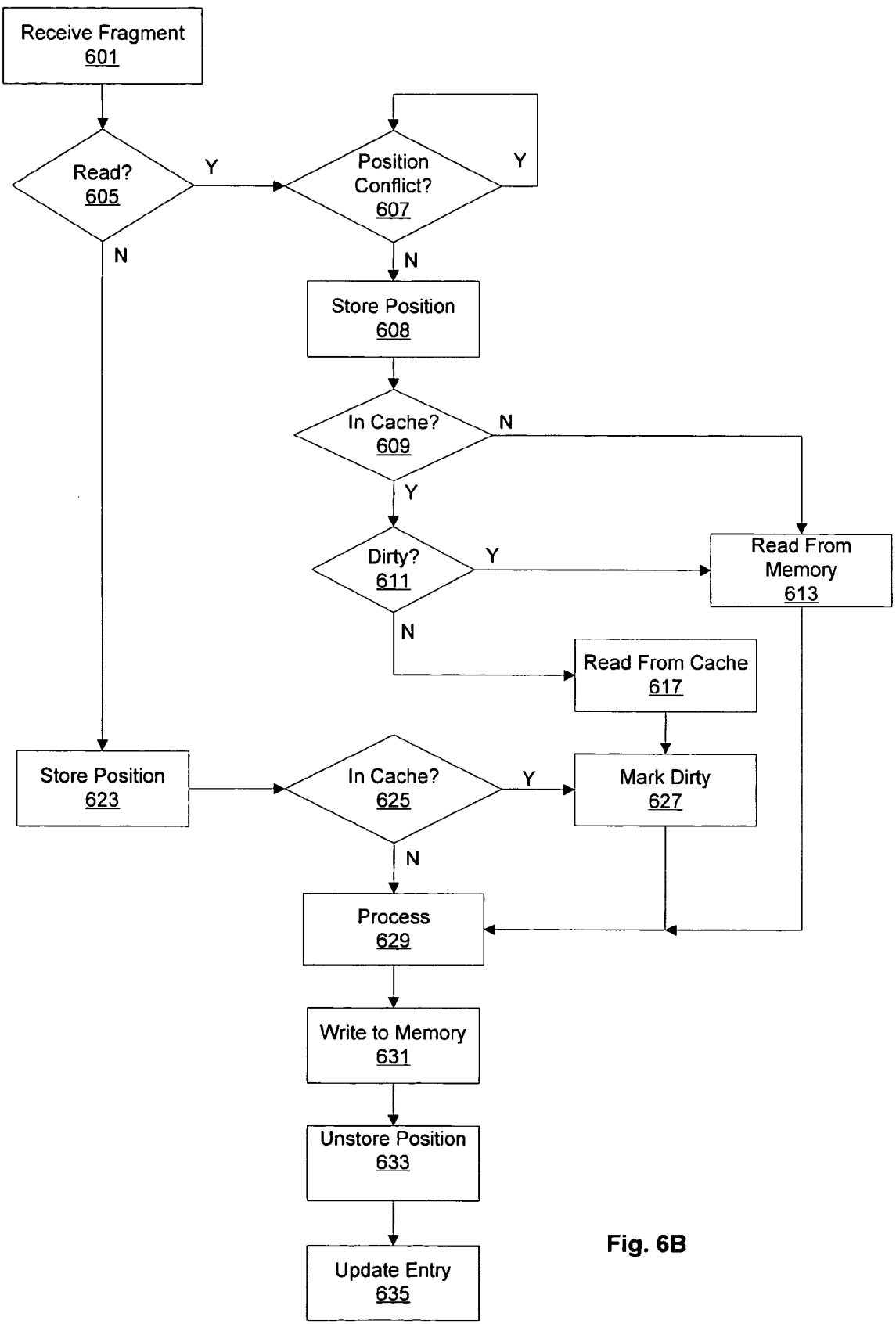

FIGS. 6A and 6B illustrate embodiments of methods of processing fragments in accordance with one or more aspects of the present invention.

Figure 1B:
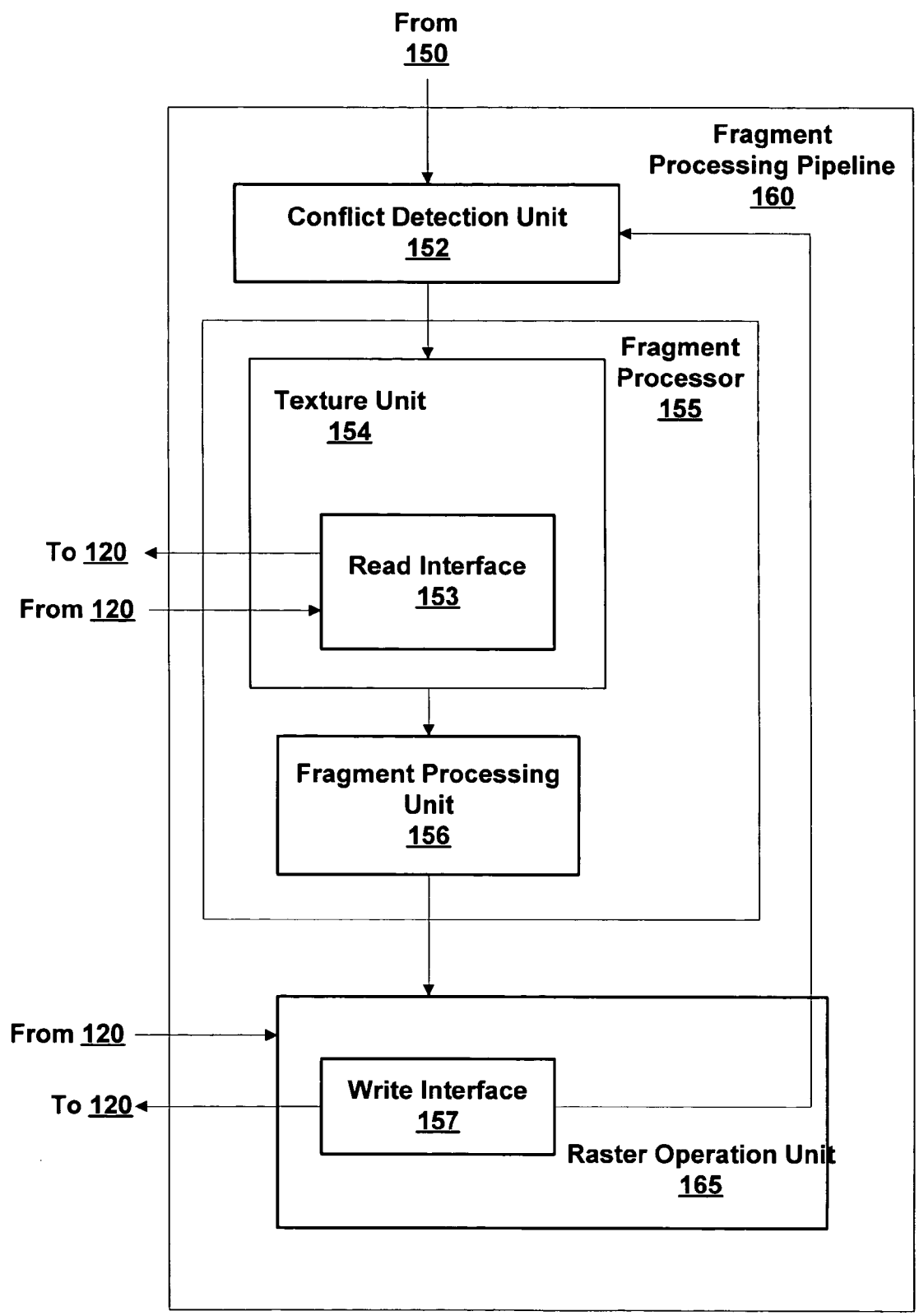
FIG. 1B is a block diagram of an exemplary embodiment of portions of Fragment Processing Pipeline of FIG. 1A in accordance with one or more aspects of the present invention.
Figure 7:
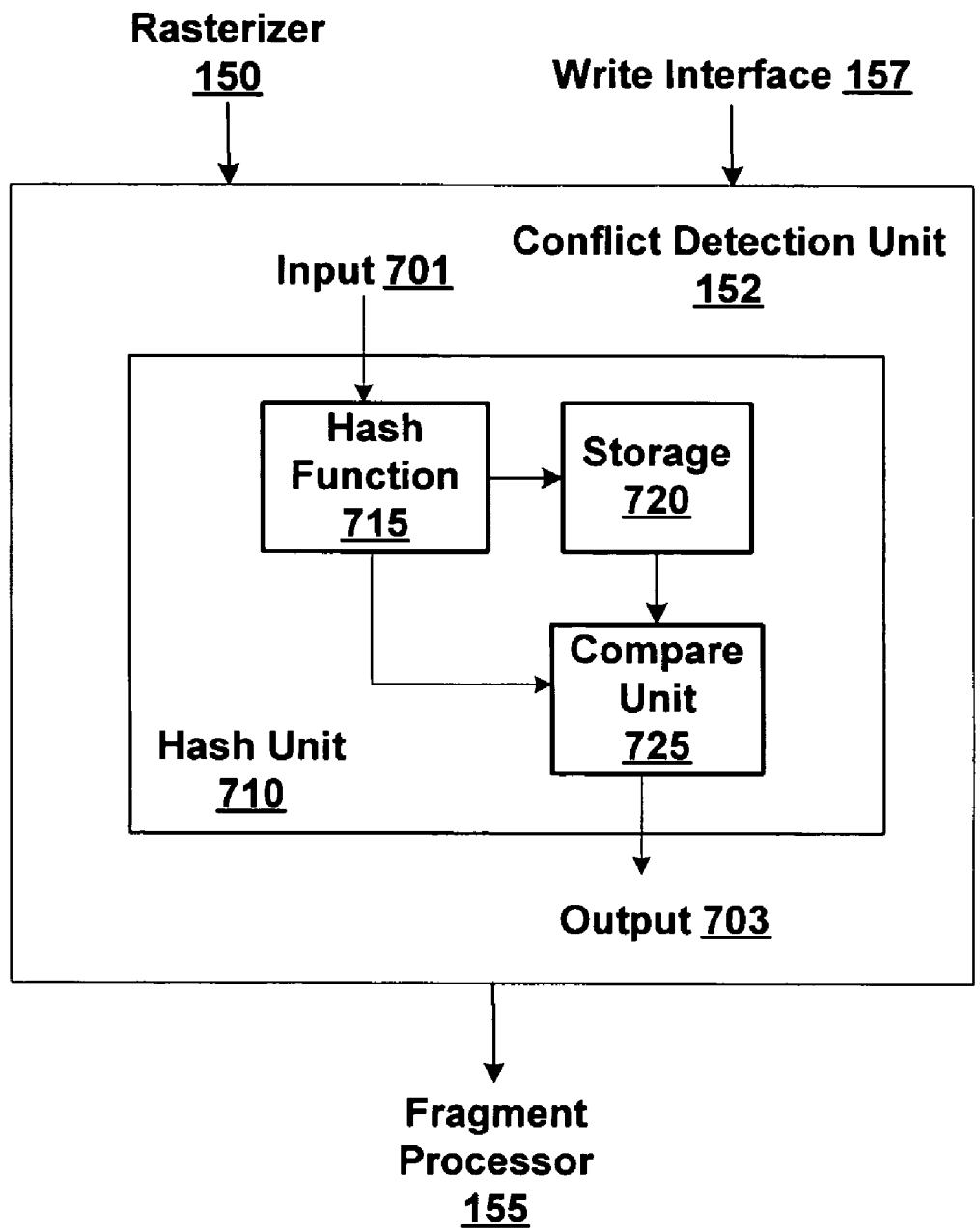

FIG. 7 is a block diagram of an exemplary embodiment of a portion of the Conflict Detection Unit of FIG. 1B or FIG. 5 in accordance with one or more aspects of the present invention.

Figure 8A:
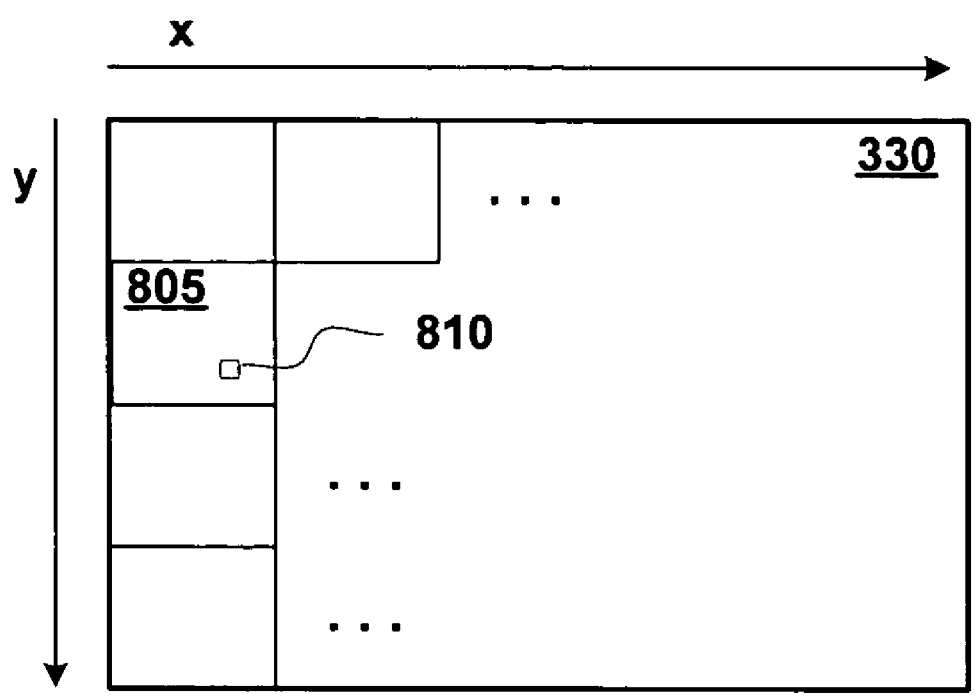

FIG. 8A illustrates a display partitioned into tiles in accordance with one or more aspects of the present invention.

Figure 8B:
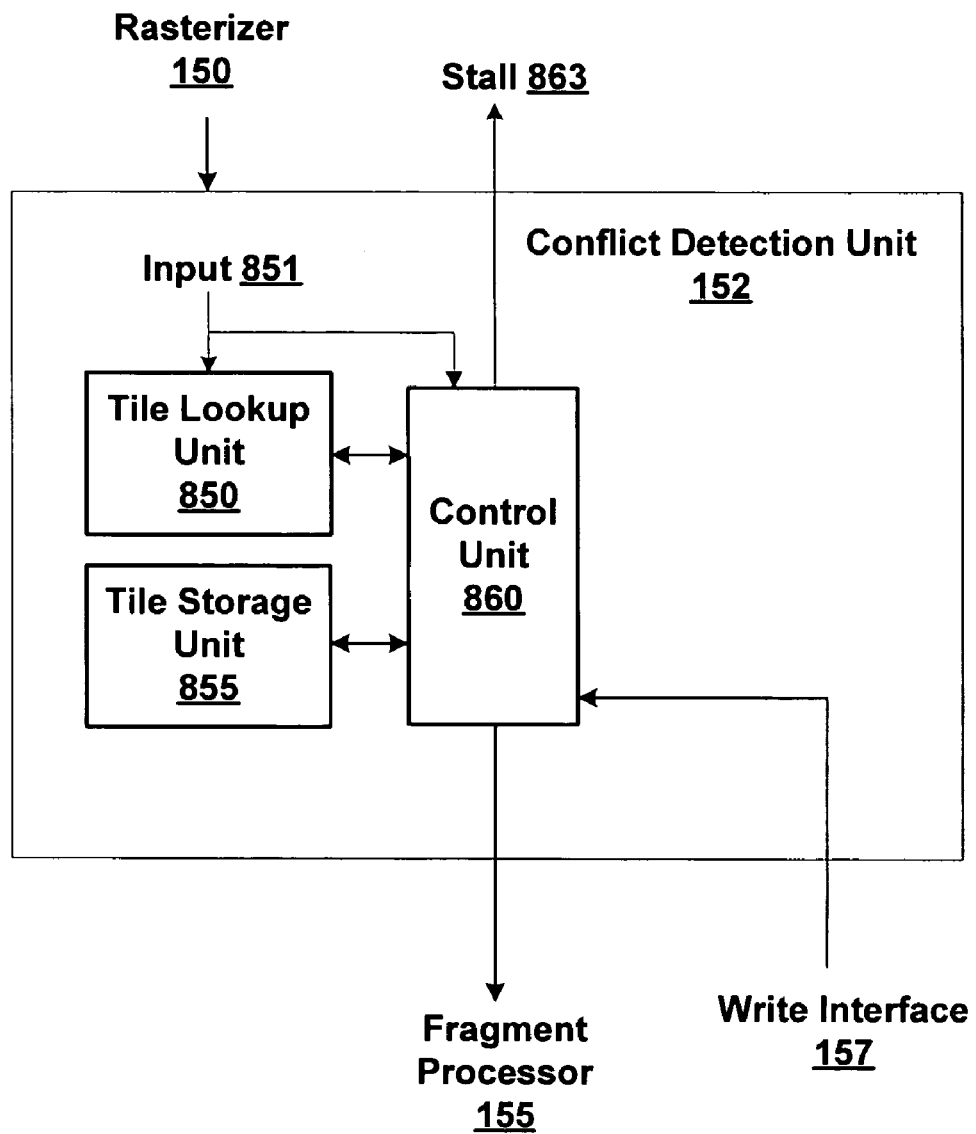

FIG. 8B is a block diagram of one embodiment of the Conflict Detection Unit of FIG. 1B or FIG. 5 in accordance with one or more aspects the present invention.

Figure 8C:
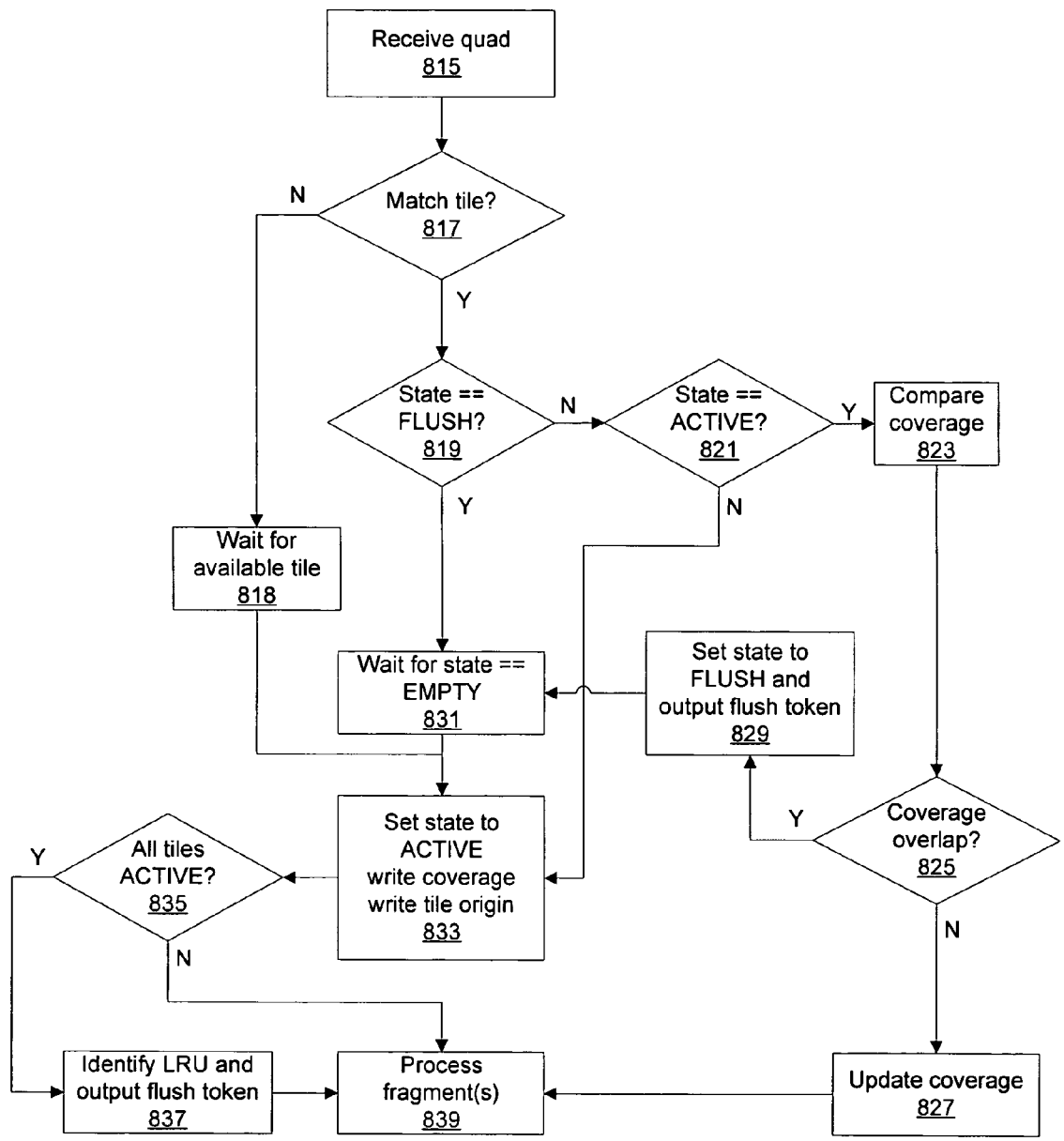

FIG. 8C illustrates a method for detecting position conflicts during fragment processing, in accordance with one embodiment of the present invention.

Figure 9A:
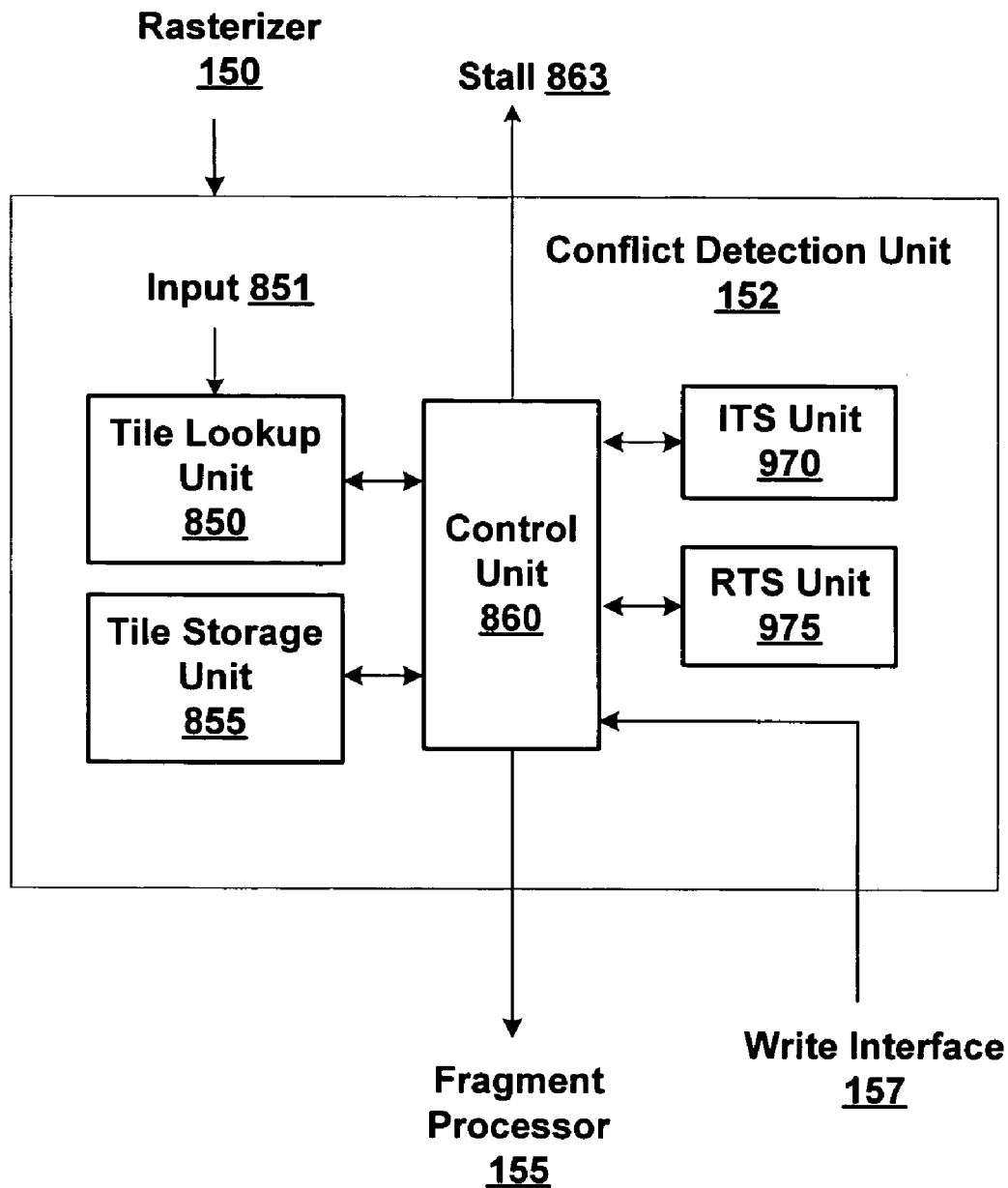

FIG. 9A is a block diagram of one embodiment of the Conflict Detection Unit of FIG. 1B or FIG. 5 in accordance with one or more aspects the present invention.

Figure 9B:
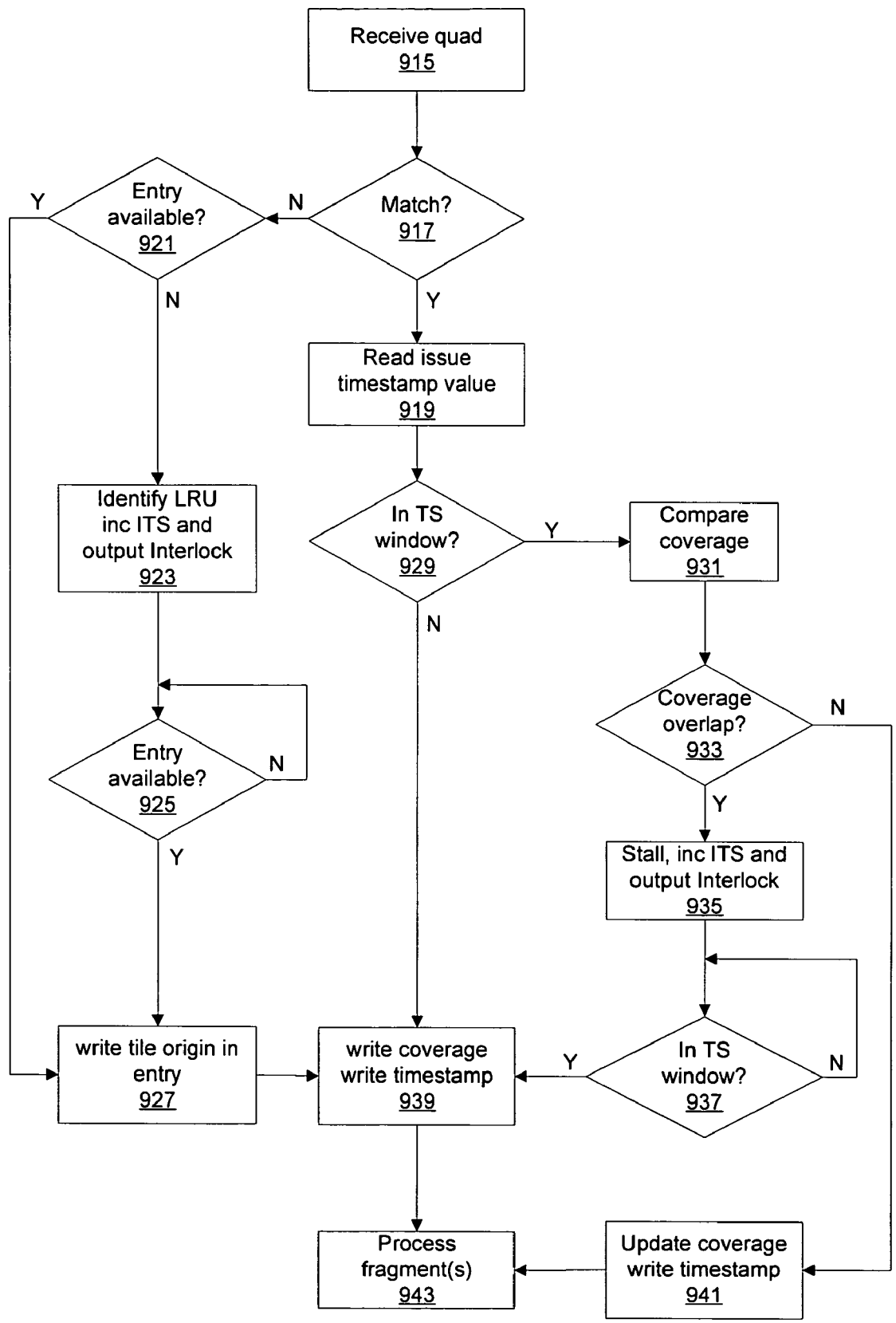

FIG. 9B illustrates a method for detecting position conflicts during fragment processing, in accordance with one embodiment of the present invention.

FIGS. 10A, 10B, 10C, and 10D illustrate embodiments of methods of processing fragment program instructions in accordance with one or more aspects of the present invention.

Figure 11A:
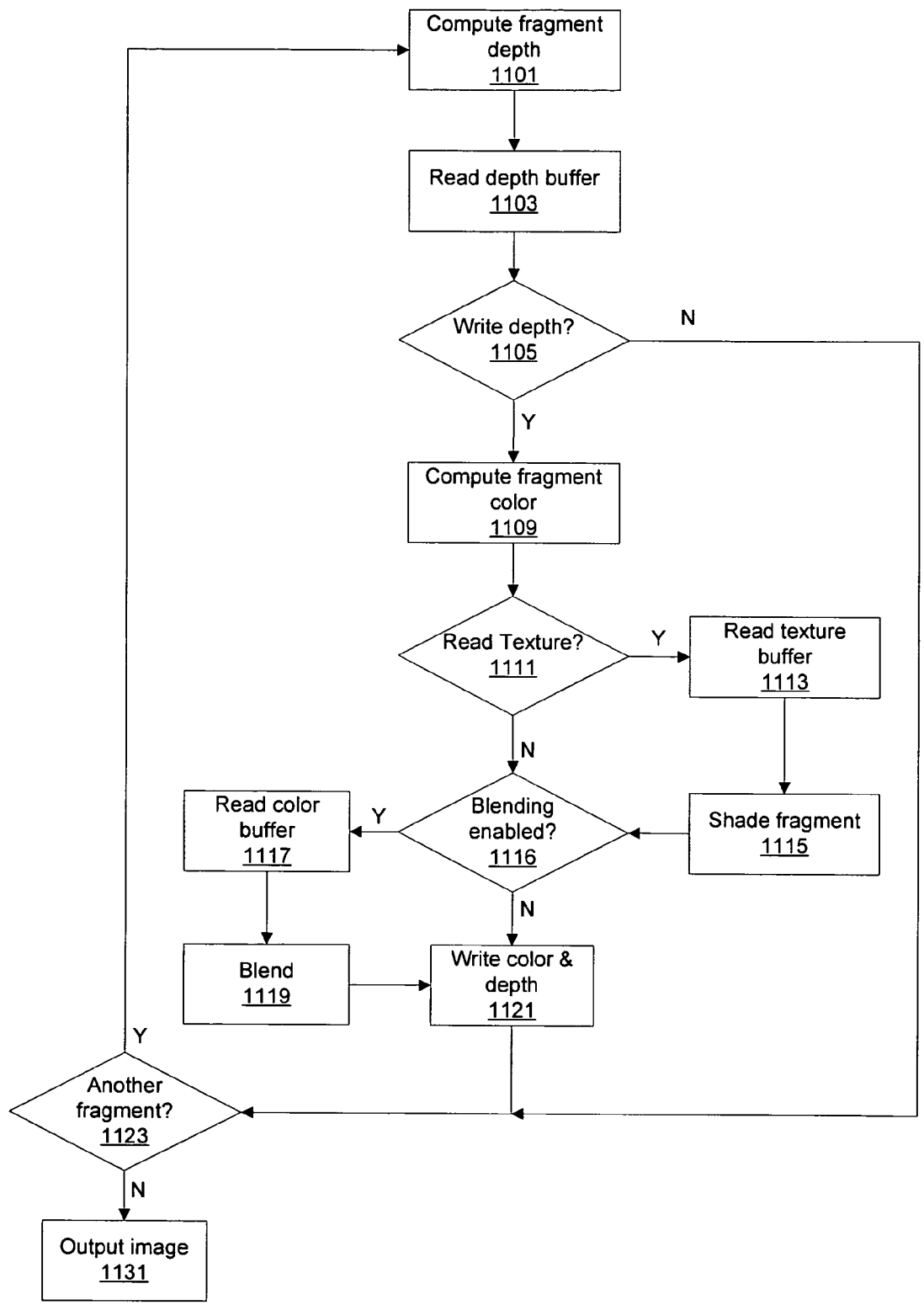

FIG. 11A illustrates an embodiment of a method of depth buffering prior to shading graphics data in accordance with one or more aspects of the present invention.

Figure 11B:
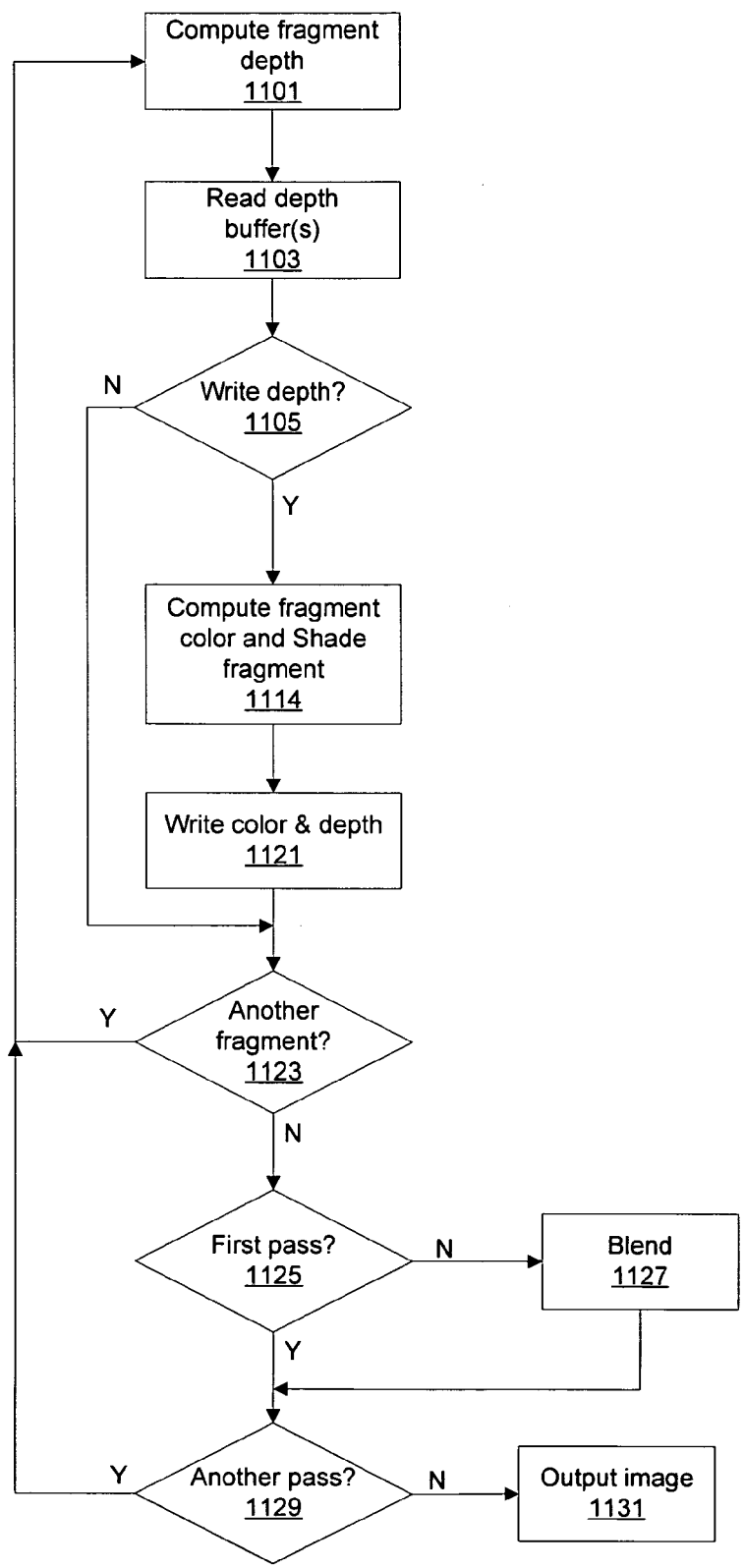
Figure 11C:
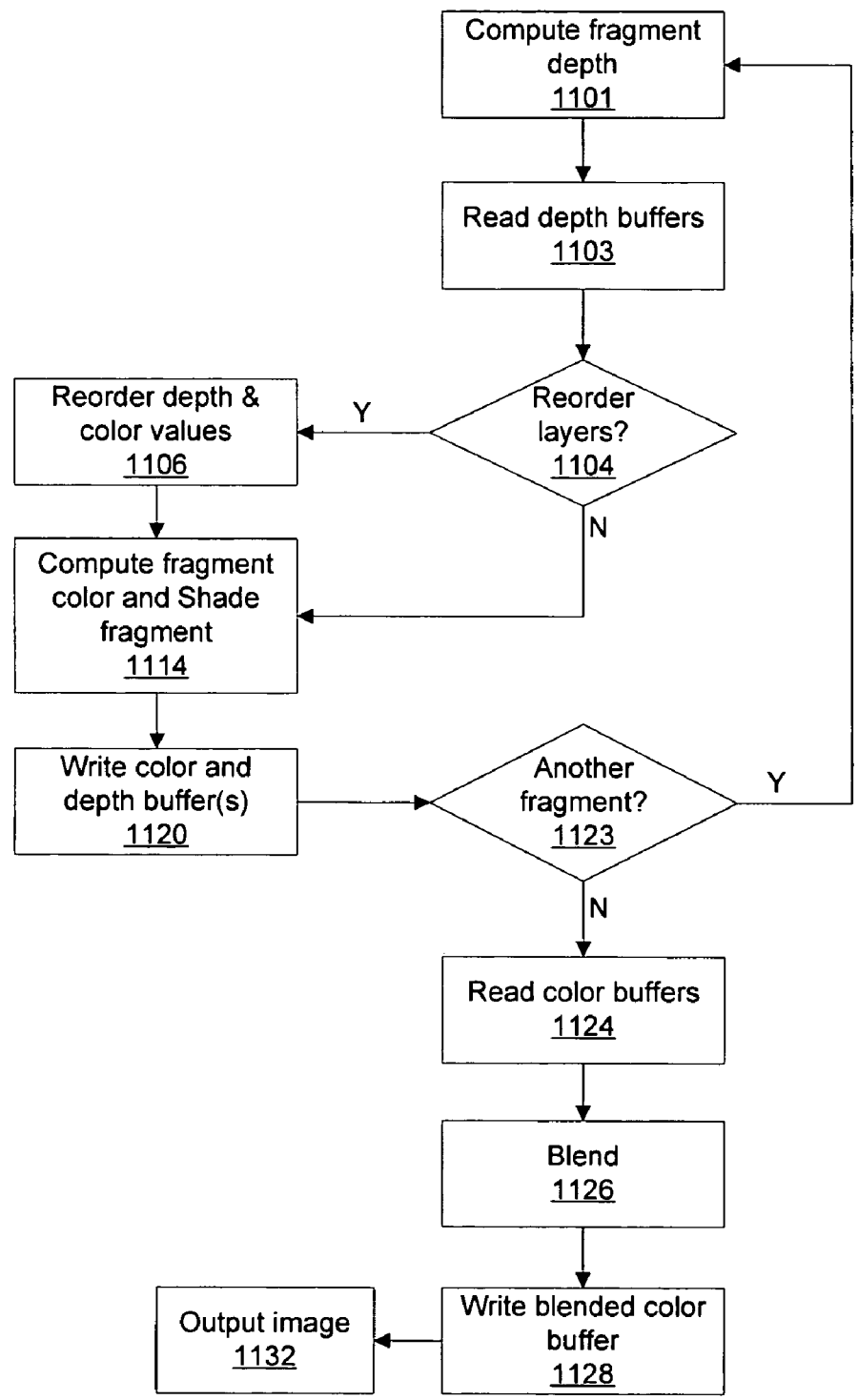

FIGS. 11B and 11C illustrate embodiments of methods of depth peeling in accordance with one or more aspects of the present invention.

Figure 12A:
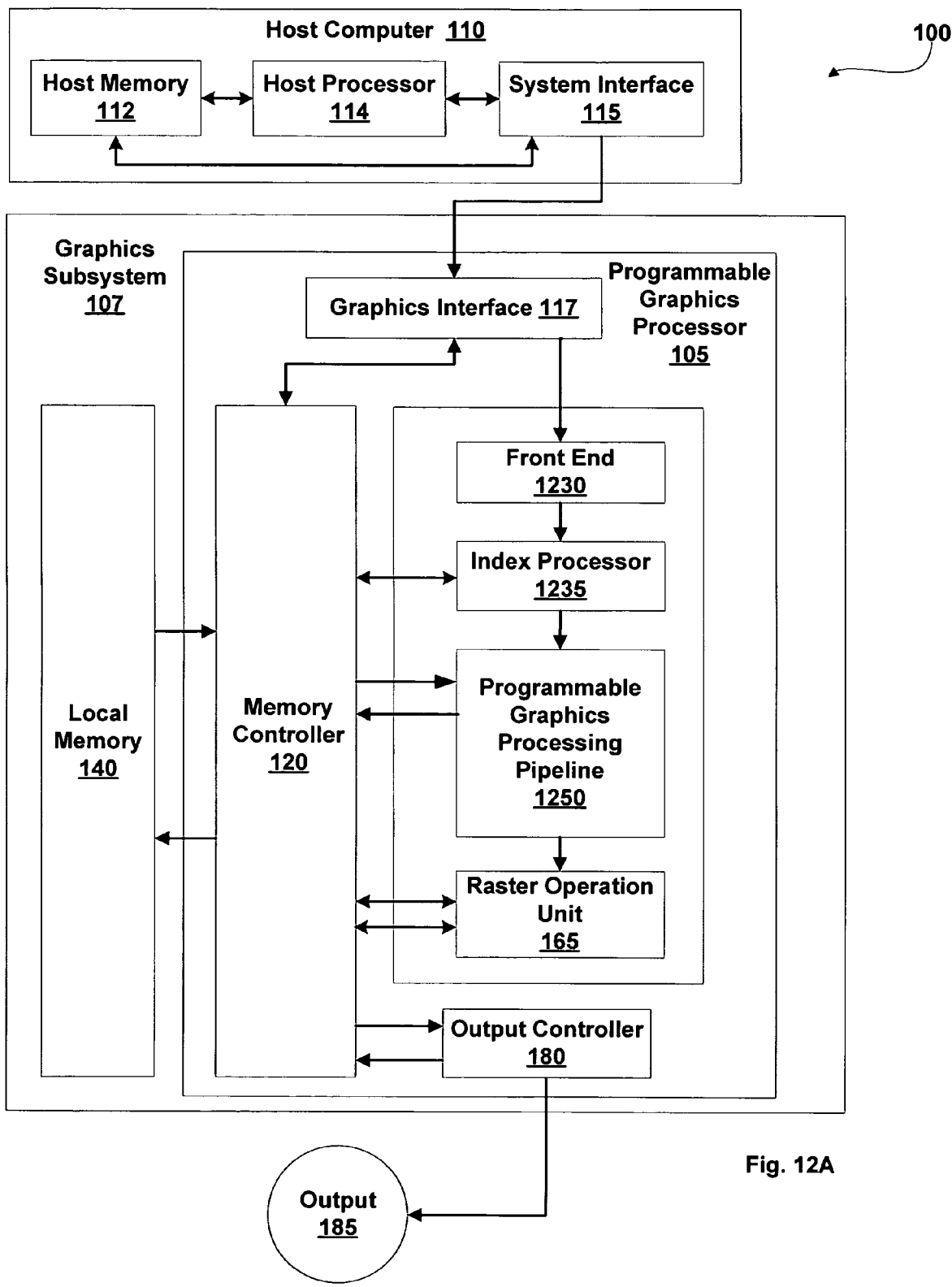

FIG. 12A is a block diagram of an exemplary embodiment of a respective computer system in accordance with one or more aspects of the present invention including a host computer and a graphics subsystem.

Figure 12B:
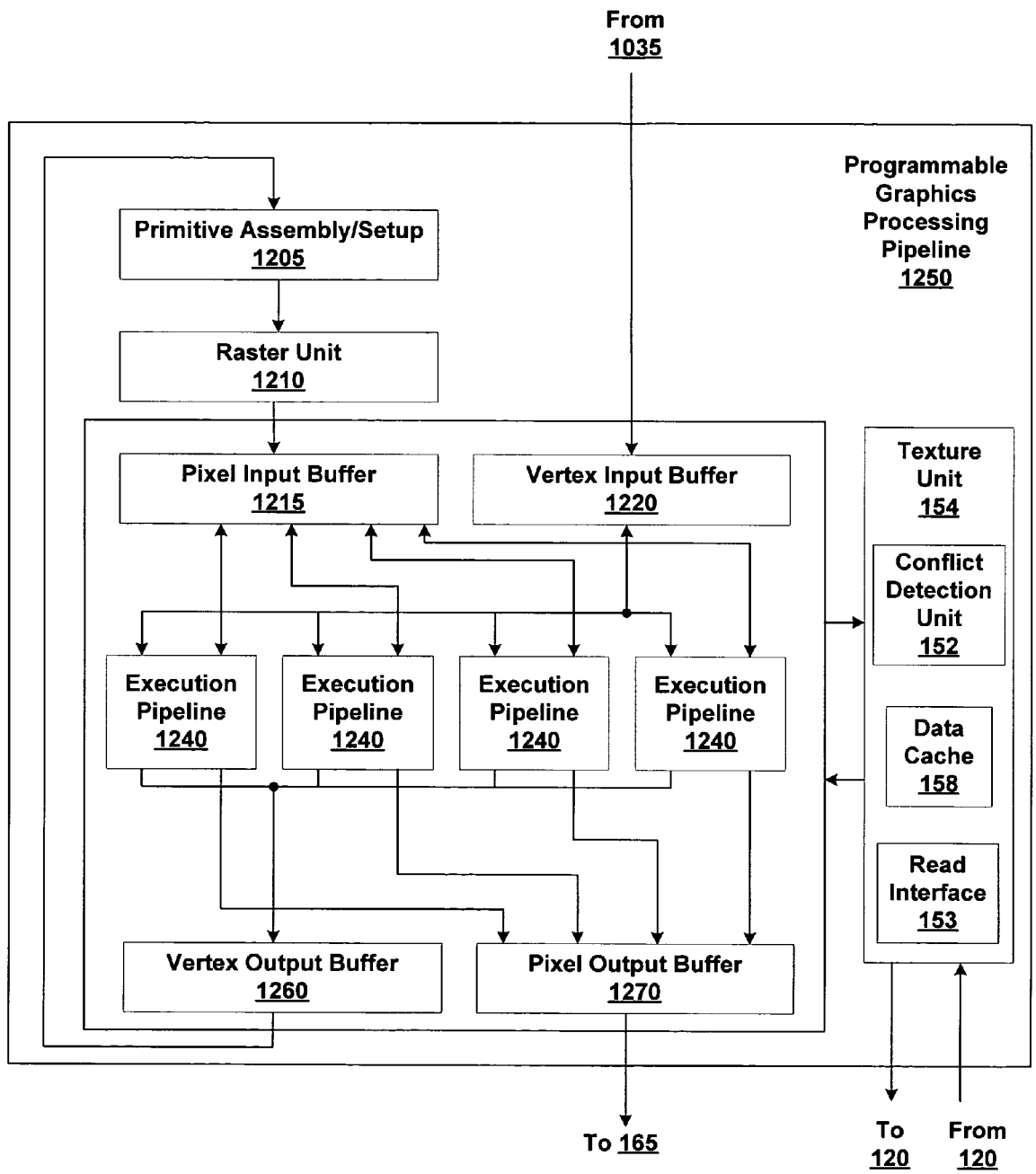
Figure 12C:
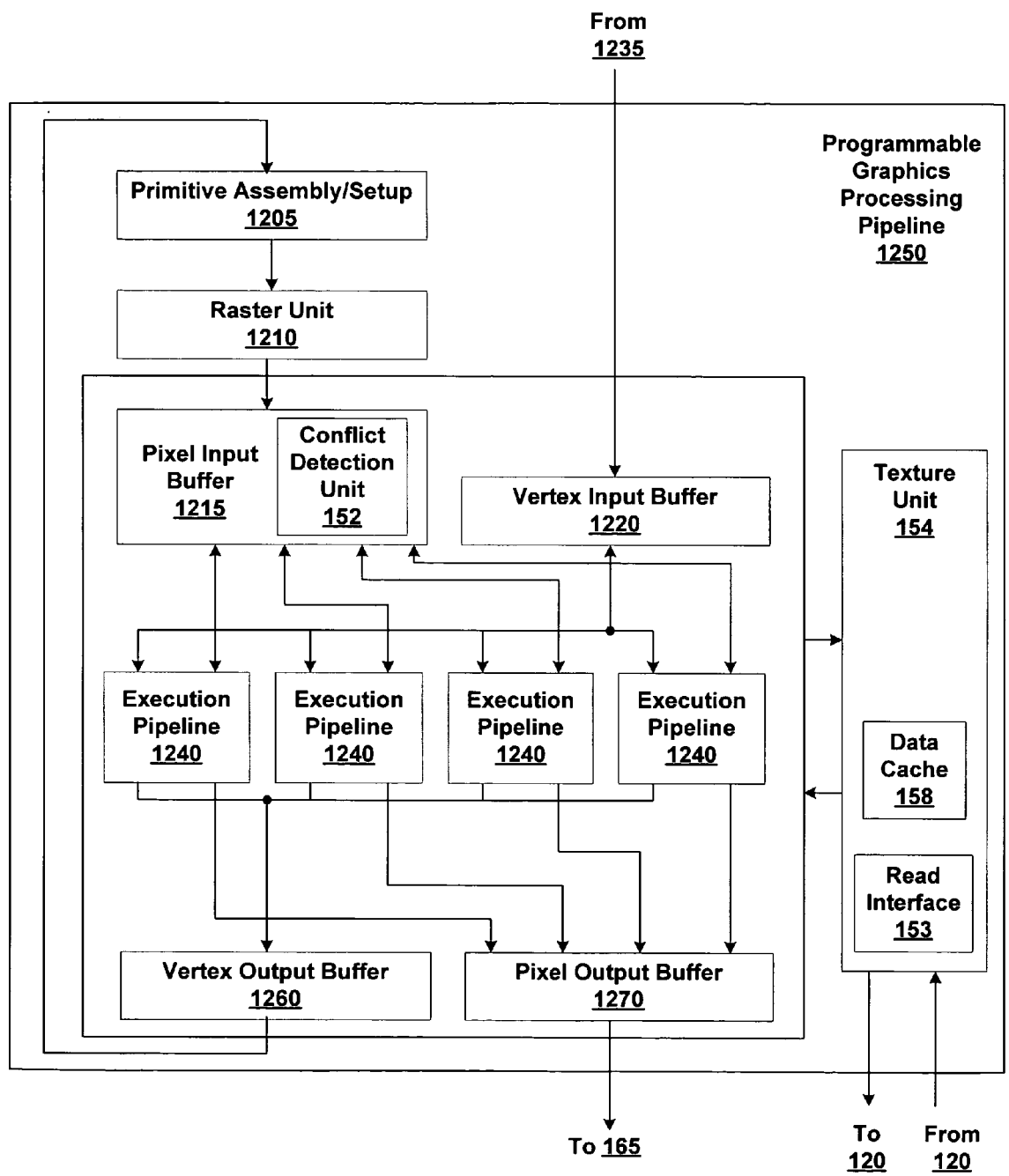

FIGS. 12B and 12C are block diagrams of exemplary embodiments of the Programmable Graphics Processing Pipeline of FIG. 12A in accordance with one or more aspects of the present invention.

DISCLOSURE OF THE INVENTION

The current invention involves new systems and methods for processing graphics data elements using position conflict detection and avoidance in a programmable graphics processor.

FIG. 1A is a block diagram of an exemplary embodiment of a Computing System generally designated 100 and including a Host Computer 110 and a Graphics Subsystem 107. Computing System 100 may be a desktop computer, server, laptop computer, palm-sized computer, tablet computer, game console, cellular telephone, computer-based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host computer 110 communicates with Graphics Subsystem 107 via System Interface 115 and a Graphics Interface 117. Graphics Subsystem 107 includes a Local Memory 140 and a Programmable Graphics Processor 105. Programmable Graphics Processor 105 uses memory to store graphics data and program instructions, where graphics data is any data that is input to or output from computation units within Programmable Graphics Processor 105. Graphics memory is any memory used to store graphics data or program instructions to be executed by Programmable Graphics Processor 105. Graphics memory may include portions of Host Memory 112, Local Memory 140 directly coupled to Programmable Graphics Processor 105, register files coupled to the computation units within Programmable Graphics Processor 105, and the like.

In addition to Graphics Interface 117, Programmable Graphics Processor 105 includes a Graphics Processing Pipeline 103, a Memory Controller 120 and an Output Controller 180. Data and program instructions received at Graphics Interface 117 can be passed to a Geometry Processor 130 within Graphics Processing Pipeline 103 or written to Local Memory 140 through Memory Controller 120. Memory Controller 120 includes read interfaces and write interfaces that each generate address and control signals to Local Memory 140, storage resources, and Graphics Interface 117. Storage resources may include register files, caches, FIFO (first in first out) memories, and the like. In addition to communicating with Local Memory 140, and Graphics Interface 117, Memory Controller 120 also communicates with Graphics Processing Pipeline 103 and Output Controller 180 through read and write interfaces in Graphics Processing Pipeline 103 and a read interface in Output Controller 180. The read and write interfaces in Graphics Processing Pipeline 103 and the read interface in Output Controller 180 generate address and control signals to Memory Controller 120.

Within Graphics Processing Pipeline 105, Geometry Processor 130 and a programmable graphics fragment processing pipeline, Fragment Processing Pipeline 160, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 130 and Fragment Processing Pipeline 160 are optionally configured such that data processing operations are performed in multiple passes through Graphics Processing Pipeline 103 or in multiple passes through Fragment Processing Pipeline 160. Each pass through Programmable Graphics Processor 105, Graphics Processing Pipeline 103 or Fragment Processing Pipeline 160 concludes with optional processing by a Raster Operation Unit 165. Data produced in a pass through Programmable Graphics Processor 105, Graphics Processing Pipeline 103 or Fragment Processing Pipeline 160 may be written to a buffer in graphics memory to be read from during a subsequent pass.

Vertex programs are sequences of vertex program instructions compiled by Host Processor 114 for execution within Geometry Processor 130 and Rasterizer 150. Fragment programs are sequences of fragment program instructions compiled by Host Processor 114 for execution within Fragment Processing Pipeline 160. Graphics Processing Pipeline 103 receives a stream of program instructions (vertex program instructions and fragment program instructions) and data from Graphics Interface 117 or Memory Controller 120, and performs vector floating-point operations or other processing operations using the data. The program instructions configure subunits within Geometry Processor 130, Rasterizer 150 and Fragment Processing Pipeline 160. The program instructions and data are stored in graphics memory. When a portion of Host Memory 112 is used to store program instructions and data, the portion of Host Memory 112 can be uncached so as to increase performance of access by Programmable Graphics Processor 105. Alternatively, configuration information is written to registers within Geometry Processor 130, Rasterizer 150 and Fragment Processing Pipeline 160 using program instructions, encoded with the data, or the like.

Data processed by Geometry Processor 130 and program instructions are passed from Geometry Processor 130 to a Rasterizer 150. Rasterizer 150 is a sampling unit that processes graphics primitives and generates sub-primitive data, such as pixel data or fragment data, including coverage data. Coverage data indicates which sub-pixel sample positions within a pixel are "covered" by a fragment formed by the intersection of the pixel and a primitive. Graphics primitives include geometry, such as points, lines, triangles, quadrilaterals, meshes, surfaces, and the like. Rasterizer 150 converts graphics primitives into sub-primitive data, performing scan conversion on the data processed by Geometry Processor 130. Rasterizer 150 outputs fragment data and fragment program instructions to Fragment Processing Pipeline 160.

The fragment programs configure the Fragment Processing Pipeline 160 to process fragment data by specifying computations and computation precision. A Fragment Processor 155 optionally is configured by fragment program instructions such that fragment data processing operations are performed in multiple internal passes within Fragment Processor 155. Fragment Processor 155 outputs processed fragment data and codewords generated from fragment program instructions to Raster Operation Unit 165. Raster Operation Unit 165 includes a read interface and a write interface to Memory Controller 120 through which Raster Operation Unit 165 accesses data stored in one or more buffers in Local Memory 140 or Host Memory 112. Raster Operation Unit 165 optionally performs near and far plane clipping and raster operations, such as stencil, z test, blending, and the like, using fragment data read from the one or more buffers in Local Memory 140 or Host Memory 112 at the x,y position associated with the fragment data and the processed fragment data to produce output data. The output data from Raster Operation Unit 165 is written back to Local Memory 140 or Host Memory 112 at the x,y position associated with the output data.

In various embodiments Memory Controller 120, Local Memory 140, and Geometry Processor 130 are configured such that data generated at various points along Graphics Processing Pipeline 103 may be output via Raster Operation Unit 165 and provided to Geometry Processor 130 or Fragment Processor 155 as input. The output data is represented in one or more formats as specified by the codewords. For example, color data may be written as 16, 32, 64, or 128 bits per pixel fixed or floating-point RGBA (red, green, blue, and alpha) to be scanned out for display. As a specific example, four 16-bit floating-point components (RGBA) are combined forming 64 bits of color data for each fragment. The output data, e.g., color, depth, and other parameters, may be processed according to a fragment program and stored in a buffer in graphics memory to be used as a texture map, e.g., shadow map, height field, stencil, and the like, by the fragment program. Alternatively, color and depth output data may be written to a buffer, and later read and processed by Raster Operation Unit 165 to generate the final pixel data prior to being scanned out for display via Output Controller 180.

For example, Fragment Processing Pipeline 160 is configured by fragment program instructions to produce processed data and store the processed data in a buffer in Local Memory 140. The Fragment Processing Pipeline 160 is configured by the fragment program instructions to read and further process the processed data. For example, Fragment Processing Pipeline 160 may be configured to implement a modified depth buffer algorithm, e.g., sorting and maintaining more than one depth value for each pixel. A modified depth buffer algorithm may be used to implement correct transparency by rendering fragments in back to front order while applying transparency blending.

Conventionally, a shading pipeline, such as Fragment Processing Pipeline 160, is flushed (using a flush instruction) prior to executing fragment program instructions that read the shadow map to avoid any read-after-write (RAW) conflicts. A RAW conflict exists when a write to an (x,y) position within a buffer is pending when a read from the same (x,y) position in the buffer is received. The RAW conflict is removed when the write to the (x,y) position within the buffer is completed. In various embodiments of Fragment Processing Pipeline 160 in accordance with one or more aspects of the present invention Fragment Processing Pipeline 160, a flush is not needed between writing a buffer and reading the buffer as an input to a Fragment Processor 155, as described further herein.

When processing is completed, an Output 185 of Graphics Subsystem 107 is provided using Output Controller 180. Alternatively, Host Processor 114 reads the composited frame, e.g., buffer, stored in Local Memory 140 through Memory Controller 120, Graphics Interface 117 and System Interface 115. Output Controller 180 is optionally configured by opcodes, received from Graphics Processing Pipeline 103 via Memory Controller 120, to deliver data to a display device, network, electronic control system, other Computing System 100, other Graphics Subsystem 110, or the like.

FIG. 1B is a block diagram of an exemplary embodiment of portions of Fragment Processing Pipeline 160 in accordance with one or more aspects of the present invention. A Conflict Detection Unit 152 receives fragment data and fragment program instructions from Rasterizer 150. In an alternate embodiment, Conflict Detection Unit 152 is included within Rasterizer 150. In a further alternate embodiment, Conflict Detection Unit 152 is included within Fragment Processor 155. Conflict Detection Unit 152 determines if a RAW conflict exists for each source read of a position in a buffer, as described further herein. Conflict Detection Unit 152 blocks processing of one or more fragments when the position conflict status indicates that a conflict exists. Conflict Detection Unit 152 outputs the fragment program instructions to Fragment Processor 155. Conflict Detection Unit 152 outputs fragment data for which conflicts do not exist to Fragment Processor 155. The fragment data is processed by Fragment Processor 155 according to the fragment program instructions. A Texture Unit 154, within Fragment Processor 155, receives the fragment data and fragment program instructions output by Conflict Detection Unit 152. A Read Interface 153, within Texture Unit 154, reads additional fragment program instructions and buffer data (texture map, height field, bump map, shadow map, jitter values, and the like) from Local Memory 140 or Host Memory 112, via Memory Controller 120. The buffer data stored in graphics memory may be generated by Programmable Graphics Processor 105, by Host Processor 114, by another device, by a human, or the like.

Memory Controller 120 outputs the buffer data and the additional fragment program instructions to Read Interface 153. Texture Unit 154 outputs the buffer data, processed fragment data, and the additional fragment program instructions to a Fragment Processing Unit 156. Fragment Processing Unit 156 processes the processed buffer data and processed fragment data as specified by the additional fragment program instructions and outputs shaded fragment data, e.g., x, y, color, depth, configuration control, other parameters, to Raster Operation Unit 165. In some embodiments Fragment Processing Unit 156 is configured to process at least two fragments in parallel. Likewise, Conflict Detection Unit 152 and Read Interface 153 may also be configured to process at least two fragments in parallel. Raster Operation Unit 165 optionally processes the shaded fragment data according to the configuration control. A Write Interface 157 within Raster Operation Unit 165 writes the optionally processed shaded fragment data to a buffer stored in Local Memory 140 or Host Memory 112, via Memory Controller 120. Write Interface 157 also outputs write position information to Conflict Detection Unit 152 to update the status of position conflicts, as described further herein.

FIGS. 2A, 2B, and 2C illustrate embodiments of methods of detecting and avoiding position conflicts in accordance with one or more aspects of the present invention. FIG. 2A illustrates an embodiment of a method of detecting and avoiding RAW position conflicts during fragment shading. In step 201 Fragment Processing Pipeline 160 receives a first fragment associated with a position within a buffer. In step 205 Fragment Processing Pipeline 160 begins shading the first fragment as specified by a fragment program, producing a shaded first fragment, and outputs the shaded first fragment to Raster Operation Unit 165. Persons skilled in the art will recognize that depending on the complexity of the fragment program or the depth of a shading pipeline, several clocks cycles, even hundreds of clock cycles may pass before the shaded first fragment is produced. In step 207 Fragment Processing Pipeline 160 receives a second fragment associated with the position within the buffer. To produce a shaded second fragment, the fragment program specifies reading the shaded first fragment as source data.

In step 209 Conflict Detection Unit 152 determines if a RAW position conflict exists for the position associated with the second fragment, and, if so, in step 211 Conflict Detection Unit 152 locks processing of the second fragment. Locking a fragment prevents any processing of the fragment requiring source data that is not yet available due to a RAW position conflict. In step 214 Raster Operation Unit 165 writes the shaded first fragment to the position in the buffer stored in graphics memory. Step 214 may be completed several, even hundreds of clock cycles after step 205. Raster Operation Unit 165 outputs the write position information to Fragment Processor 155 confirming that the write is complete. In one embodiment the write is considered complete when the write request is output from Memory Controller 120 to Local Memory 140 or to Host Memory 112 via Graphics Interface 117. In another embodiment the write is considered complete when the write request is output from Raster Operation Unit 165 to Memory Controller 120. In step 217 Fragment Processing Pipeline 160 unlocks the second fragment and proceeds to step 220. In step 220 Fragment Processor 155 begins shading the second fragment as specified by the shader.

If, in step 209 Conflict Detection Unit 152 determines a RAW position conflict does not exist for the position associated with the second fragment, then in step 220 Fragment Processor 155 begins shading the second fragment as specified by the fragment program producing a shaded second fragment. In step 222 Fragment Processor 155 receives one or more additional fragments, each fragment associated with a position for which a RAW position conflict does not exist. Fragment Processor 155 shades the one or more additional fragments. In step 214 Raster Operation Unit 165 writes the shaded first fragment to the position in the buffer stored in graphics memory and outputs the write position information to Conflict Detection Unit 152 confirming that the write is complete.

After shading the second fragment, Fragment Processor 155 outputs the shaded second fragment to Raster Operation Unit 165. The number of clock cycles from step 220 to when the shaded second fragment is output by Fragment Processor 155 to Raster Operation Unit 165 may depend on the complexity of the shading program or the number of pipeline stages in Fragment Processor 155. In an alternate embodiment, step 214 is completed before step 222. In a further alternate embodiment Fragment Processing Pipeline 160 does not receive the one or more additional fragments and step 222 is omitted.

FIG. 2B illustrates an embodiment of a method of detecting and avoiding RAW position conflicts during fragment shading including the steps illustrated in FIG. 2A. In step 201 Fragment Processing Pipeline 160 receives a first fragment associated with a position within a buffer. The fragment program specifies writing a shaded first fragment to the position within the buffer. In step 203 Conflict Detection Unit 152 receives the position. In one embodiment the position is represented as a pair of coordinates, e.g., (x,y), (s,t), (u,v), and the like, and the coordinates or portions of the coordinates are stored in Conflict Detection Unit 152. The coordinates may be represented relative to a buffer or relative to a display. Coordinates represented within a buffer may be converted into coordinates within a display, e.g., screen coordinates, by applying coordinate offsets based on a position of the buffer within the display. In another embodiment the position is represented as an address for a location in graphics memory. In yet another embodiment the position includes a buffer identifier specifying which of several buffers the position is associated with. In still another embodiment, Conflict Detection Unit 152 identifies a region including the location and stores data, e.g. one or more bits, corresponding to the region. A region may represent several positions, where the positions may correspond to a region of an image, a region of an output buffer, a sequence of physical memory addresses in graphics memory, or the like. Conflict Detection Unit 152 may store data for several regions, depending on a predetermined resolution of the positions to be tracked.

In step 205 Fragment Processor 155 begins shading the first fragment, as specified by the fragment program producing a shaded first fragment, several cycles or more later. The shaded first fragment is output to Raster Operation Unit 165. In step 207 Fragment Processing Pipeline 160 receives a second fragment associated with the position within the buffer. To produce a shaded second fragment, the fragment program specifies reading the shaded first fragment as source data.

In step 209 Conflict Detection Unit 152 determines if a RAW position conflict exists for the position associated with the second fragment, and, if so, then in step 211 Conflict Detection Unit 152 locks processing of the second fragment. In step 214 Raster Operation Unit 165 writes the shaded first fragment to the position in the buffer stored in graphics memory. Raster Operation Unit 165 outputs the write position information to Conflict Detection Unit 152 confirming that the write is complete. In step 215 the position is removed from Conflict Detection Unit 152, thereby updating the status of the position conflict.

In step 217 Conflict Detection Unit 152 unlocks the second fragment and in step 218 Conflict Detection Unit 152 determines if the fragment program specifies writing the shaded second fragment to the position within the buffer. If the fragment program specifies writing the shaded second fragment to the position within the buffer then, in step 219 the position is entered in Conflict Detection Unit 152 and the second fragment is output to Fragment Processor 155. In step 220 Fragment Processor 155 begins shading the second fragment as specified by the fragment program, producing a shaded second fragment several or more clock cycles later. The shaded second fragment is output by Fragment Processor 155 to Raster Operation Unit 165.

If, in step 209 Conflict Detection Unit 152 determines a RAW position conflict does not exist for the position associated with the second fragment, then in step 218 Conflict Detection Unit 152 determines if the fragment program specifies writing the shaded second fragment to the position within the buffer. If the fragment program specifies writing the shaded second fragment to the position within the buffer then, in step 219 the position is entered in Conflict Detection Unit 152 and the second fragment is output to Fragment Processor 155. In step 220 Fragment Processor 155 begins shading the second fragment as specified by the fragment program, producing a shaded second fragment several or more clock cycles later. Steps 222 and 214 proceed as previously described in relation to FIG. 2A and in step 215 the first position is removed from Conflict Detection Unit 152.

FIG. 2C illustrates an embodiment of a method of detecting and avoiding RAW position conflicts during fragment shading including the steps illustrated in FIGS. 2A and 2B. In this embodiment, a third fragment bypasses the locked second fragment and is shaded before the second fragment is shaded. Steps 201, 203, 205, 207, 209, 211, 218, 219 and 220 are completed as described in relation to FIG. 2B. In step 212 (following step 211) Fragment Processor 155 receives a third fragment associated with another position within the buffer. In step 213 Fragment Processor begins shading the third fragment as specified by the fragment program. The number of clock cycles from step 213 to when a shaded third fragment is output by Fragment Processor 155 to Raster Operation Unit 165 may depend on the complexity of the shading program or the number of pipeline stages in Fragment Processor 155. Steps 214, 215, and 217 proceed as described in relation to FIG. 2B.

If, in step 209 Conflict Detection Unit 152 determines a RAW position conflict does not exist for the position associated with the second fragment, then in step 218 Conflict Detection Unit 152 determines if the fragment program specifies writing the shaded second fragment to the position within the buffer. If the fragment program specifies writing the shaded second fragment to the position within the buffer then, in step 219 the position is entered in Conflict Detection Unit 152 and the second fragment is output to Fragment Processor 155. In step 220 Fragment Processor 155 begins shading the second fragment as specified by the fragment program, producing a shaded second fragment several or more clock cycles later. Steps 212 and 213 proceed as previously described. Steps 222 and 214 proceed as previously described in relation to FIG. 2A and in step 215 the first position is removed from Conflict Detection Unit 152.

FIG. 3A is a conceptual diagram of a Buffer 320 displayed by a display device, e.g., monitor, projector, and the like. Data stored in Buffer 320 is displayed on Display 330. Additional buffers of arbitrary sizes may be displayed on Display 330. Each buffer may be positioned for display relative to Display 330. A Pixel 340 within Buffer 320 is associated with an x,y position relative to Display 330. In an alternate embodiment the x,y origin is in the lower left corner of Display 330.

FIG. 3B illustrates a Portion of Graphics Memory 350 including locations storing data for Buffer 320. Locations within a Section 360 store data for Buffer 320. For example, a Location 366 stores data associated with Pixel 340, e.g., color, depth, stencil, shadow depth, and the like. An Address 364 is used to access the Location 366. Address 364 may be computed based on an x,y position and a base address corresponding to a first location within Section 360. In an alternate embodiment Address 364 is computed based on a position within Buffer 320 and an address offset within Portion of Graphics Memory 350 corresponding to Section 360. A Section 370 includes locations storing data for another buffer. Each buffer is associated with a unique buffer identifier that may be used to determine a corresponding base address.

FIG. 4A illustrates a method of processing graphics data (fragments) in accordance with one or more aspects of the present invention. Fragments are not necessarily processed in the order in which the fragments are received, specifically when a position conflict exists since one or more fragments for which conflicts do not exist may bypass one or more fragments for which conflicts do exist. However, fragment order for each x,y position is maintained, i.e. a fragment associated with one x,y position may bypass a fragment associated with another x,y position. In step 401 fragments are received by Fragment Processing Pipeline 160. A fragment is associated with a specific location in a buffer to be read. Other fragments may be associated with either, the specific location in the buffer, other locations in the buffer, or locations in another buffer. In step 403 the location in the buffer associated with the fragment is tracked using Conflict Detection Unit 152, as described further herein. Conflict Detection Unit 152 determines that a write to the location in the buffer is pending. In step 405 at least a portion of the fragments are shaded by Fragment Processing Unit 156 as specified by a fragment program, producing shaded fragment data. In step 409 the shaded fragment data is output by Fragment Processor 155 to Raster Operation Unit 165.

In step 411 Conflict Detection Unit 152 determines if the write to the location in the buffer is still pending, and, if so, in step 413 Conflict Detection Unit 152 waits for the write to the location in the buffer to be completed. When the write is no longer pending, i.e., when the write is completed, Conflict Detection Unit 152 proceeds to step 417. In step 413, if additional fragments or fragments remaining after at least a portion of the fragments are shaded in step 405 are available for shading without position conflicts, those additional fragments or fragments remaining are output by Conflict Detection Unit 152 to Fragment Processor 155 and are shaded by Fragment Processing Unit 156.

If, in step 411, the write to the location in the buffer is not pending, Conflict Detection Unit 152 proceeds to step 417. The write to the location in the buffer may be completed when either the shaded fragment data output by Fragment Processor 155 to Raster Operation Unit 165 in step 409 is written or when other shaded fragment data (produced using other fragments received prior to the fragments received in step 401) is written to the location in the buffer.

In step 417 Read Interface 153 reads data stored in the location in the buffer. In step 419 the fragment associated with the location in the buffer is shaded by Fragment Processing Unit 156 as specified by the fragment program, producing additional shaded fragment data. In step 421 the additional shaded fragment data is output by Fragment Processor 155 to Raster Operation Unit 165.

FIG. 4B illustrates a method of processing graphics data including some of the steps shown in FIG. 4A. A fragment program specifies writing data to a location in a buffer to process a first fragment and reading the data from the location in the buffer to produce shaded fragment data for a second fragment without an intervening flush of Fragment Processor 155 or Fragment Processing Pipeline 160.

In step 401 fragments are received by Fragment Processing Pipeline 160. In step 402 the location in the buffer to be written by the first fragment is entered in Conflict Detection Unit 152 (CDU). The second fragment is also associated with the location in the buffer, specifically the fragment program specifies using data read from the location (source data) to produce a shaded second fragment. Conflict Detection Unit 152 determines that a write to the location in the buffer is pending and does not initiate reading the location in the buffer. Steps 405, 409, 411, and 413 are completed as previously described in relation to FIG. 4A.

Following step 411 or step 413, Conflict Detection Unit 152 proceeds to step 416. In step 416 Raster Operation Unit outputs write position information to Conflict Detection Unit 152 to update the status of the position conflict, i.e., removing the location from Conflict Detection Unit 152. Steps 417, 419, and 421 proceed as described in regard to FIG. 4A.

FIG. 5 is a block diagram of an exemplary embodiment of portions of Fragment Processing Pipeline 160, including a Data Cache 158. Fragment data received by Fragment Processing Pipeline 160 from Rasterizer 150 is processed according to the fragment program instructions and Conflict Detection Unit 152 determines if a RAW conflict exists for each fragment. Conflict Detection Unit 152 outputs fragment data and the fragment program instructions to Fragment Processor 155. A Read Interface 153 within Texture Unit 154 reads additional fragment program instructions and buffer data from Data Cache 158. When the additional fragment program instructions or the buffer data are not available in Data Cache 158, i.e., there is a "cache miss", the additional fragment program instructions or the buffer data is read from either Local Memory 140 or Host Memory 112, via Memory Controller 120 and optionally stored in Data Cache 158 and output by Read Interface 153. When a location is entered in Conflict Detection Unit 152 for a pending write, Conflict Detection Unit 152 determines if data stored in the location is available in an entry in Data Cache 158 and if so, invalidates the entry in Data Cache 158 as described further herein. In an alternate embodiment, entries in Data Cache 158 containing data read from a location that is entered in Conflict Detection Unit 152 are invalidated by Read Interface 153.

Texture Unit 154 outputs the texture map data, processed fragment data, and the additional program instructions to a Fragment Processing Unit 156. Fragment Processing Unit 156 stores the buffer data in a Register 159 to be used as source data. Fragment Processing Unit 156 processes the processed map data and processed fragment data as specified by the additional fragment program instructions and outputs shaded fragment data, e.g., x, y, color, depth, configuration control, other parameters, to Raster Operation Unit 165. Raster Operation Unit 165 optionally processes the shaded fragment data according to the configuration control. A Write Interface 157 within Raster Operation Unit 165 writes the optionally-processed shaded fragment data to a buffer stored in Local Memory 140 or Host Memory 112, via Memory Controller 120. Write Interface 157 also outputs write position information to Conflict Detection Unit 152 to update the status of position conflicts. Write Interface 157 outputs the position information and processed shaded fragment data to Data Cache 158 to update the entry.

The entry in Data Cache 158 may have been allocated to store data associated with another location in which case Data Cache may store the processed shaded fragment data in the next available entry. In an alternate embodiment Write Interface 157 does not output the processed shaded fragment data to Data Cache 158, and Data Cache 158 instead reads the processed shaded fragment data from the buffer. In another alternate embodiment the write position information includes a buffer identifier and Data Cache 158 stores data for more than one buffer.

FIG. 6A illustrates a method of processing fragments in Fragment Processing Pipeline 160. In step 601 Conflict Detection Unit 152 receives a fragment. In step 605, Conflict Detection Unit 152 determines if processing the fragment as specified by a fragment program requires a read of source data, and, if not, Conflict Detection Unit 152 proceeds to step 621. If, in step 605, Conflict Detection Unit 152 determines that the fragment program specifies a read, in step 607 Conflict Detection Unit 152 determines if there is a position conflict with the location to be read (source location). If, in step 607 Conflict Detection Unit 152 determines there is a position conflict, Conflict Detection Unit 152 remains in step 607 and processing of the fragment does not continue until the conflict does not exist. The conflict does not exist when a pending write to the location is completed.

If, in step 607, Conflict Detection Unit 152 determines there is not a position conflict, then in step 608 Conflict Detection Unit 152 stores a destination location and outputs the fragment to Fragment Processor 155. A destination location may be an x,y position, an address corresponding to a memory location, a register address, or the like. The destination position is stored because there is an implied write for each fragment being processed. However a processed fragment may not be written to a destination position if the processed fragment fails a depth or stencil test as determined by Raster Operation Unit 165. In step 613 Read Interface 153 reads the source location in graphics memory to obtain buffer data and outputs the buffer data. If, in step 605, Conflict Detection Unit 152 determines that the fragment program does not specify a read, in step 623 Conflict Detection Unit 152 stores the position to be written (destination location) in Conflict Detection Unit 152 and outputs the fragment to Fragment Processor 155.

In step 629 Texture Unit 154 outputs the fragment and any source data, read from the source location in step 613, to Fragment Processing Unit 156 for processing as specified by the fragment program. In step 631 Fragment Processing Unit 156 outputs shaded data and configuration control to Raster Operation Unit 165. Raster Operation Unit 165 processes the shaded data and Write Interface 157 and optionally outputs the processed shaded data to Memory Controller 120 with a write request to the destination location. Write Interface 157 also outputs a write update to Conflict Detection Unit 152. The write update is output to Conflict Detection Unit 152 even when the processed shaded data is not written to the destination location because it failed a depth or stencil test. In step 633 Conflict Detection Unit 152 unstores the position, as described further herein.

FIG. 6B illustrates a method of processing fragments in Fragment Processor 155 including Data Cache 158. Steps 601, 605, and 607 are completed as described in regard to FIG. 6A. In step 608 Conflict Detection Unit 152 stores a destination location and outputs the fragment and destination location to Fragment Processor 155. In step 609 Read Interface 153 outputs the read request to Data Cache 158 and Data Cache 158 determines if the location to be read is available in an entry within Data Cache 158, and, if not proceeds to step 613. If, in step 609, Data Cache 158 determines buffer data stored in the location to be read is available in an entry, in step 611, Data Cache 158 determines if the entry is "dirty". An entry is dirty when it has been marked as invalid, such as when a write is pending to a location in graphics memory containing the buffer data that is stored in the entry. If, in step 611, Data Cache 158 determines that the entry is dirty, Data Cache 158 reports a cache miss to Read Interface 153 and proceeds to step 613. In step 613 Read Interface 153 reads the location in graphics memory to obtain the buffer data, optionally stores the buffer data in an entry within Data Cache 158, outputs the buffer data (source data), and proceeds to step 629. If, in step 611, Data Cache 158 determines that the entry is not dirty, then in step 617 Data Cache 158 outputs the buffer data stored in the entry and proceeds to step 627.

If, in step 605, Conflict Detection Unit 152 determines that the fragment program does not specify a read, in step 623 Conflict Detection Unit 152 stores the position to be written (destination location) and outputs the fragment and destination location to Fragment Processor 155. In step 625 Data Cache 158 determines if any entry is associated with the destination location, and, if so, in step 627 Data Cache 158 marks the entry associated with the destination location as "dirty". If, in step 625 Data Cache 158 determines no entries are associated with the destination location, Data Cache 158 proceeds to step 629.

In step 629 Texture Unit 154 outputs the fragment and any buffer data read in step 613 or step 617 to Fragment Processing Unit 156 for processing as specified by the fragment program. In step 631 Fragment Processing Unit 156 outputs shaded data and configuration control to Raster Operation Unit 165. Raster Operation Unit 165 processes the shaded data and Write Interface 157 and optionally outputs the processed shaded data to Memory Controller 120 with a write request to the destination location. Write Interface 157 also outputs a write update to Conflict Detection Unit 152. In step 633 Conflict Detection Unit 152 unstores the position, as described further herein. In step 635 if the processed shaded data was output to Memory Controller 120 in step 631, Write Interface 157 outputs the processed shaded data and destination location to Data Cache 158. Data Cache 158 stores the processed shaded data in an entry associated with the destination location.

FIG. 7 is a block diagram of an exemplary embodiment of a portion of Conflict Detection Unit 152 in accordance with one or more aspects of the present invention. A Hash Unit 710 receives an Input 701 produces an Output 703. Input 701 may include a buffer identification, a position (source location or destination location), a source read request, a destination write request, and a destination write confirmation. The source read request is asserted when a fragment program instruction specifies a read. The destination write request is asserted when a fragment program instruction specifies a write. The destination write confirmation is received from Write Interface 157 when a write is completed (write position confirmation).

A Hash Function 715 within Hash Unit 710 receives a first portion of Input 701 and outputs an index to a storage resource, Storage 720. A storage resource may be a register file, embedded RAM, or the like. When the destination write request is asserted a second portion of Input 701 is output by Hash Function 715 to Storage 720. The second portion of Input 701 is stored in an entry, accessed using the index provided by Hash Function 715, in a Storage 720. When the destination write request is asserted a Compare Unit 725 outputs a signal on Output 703 indicating that a position conflict does not exist.

When the destination write confirmation is received from Write Interface 157, Input 701 provides the destination write confirmation to Hash Function 715. Hash Function 715 outputs an index to Storage 720 and the entry corresponding to the index is cleared or otherwise marked as available.

When the source read request is asserted, Storage 720 outputs the data stored in the entry corresponding to the index to a Compare 725. Compare 725 also receives the second portion of Input 701 from Hash Function 715 and compares it to the data output by Storage 720. When the second portion of Input 701 is equal to the data output by Storage 720, Compare 725 outputs a signal on Output 703 indicating that a position conflict exists. When the second portion of Input 701 is not equal to the data output by Storage 720 Compare 725 outputs a signal indicating that a position conflict does not exist. When a position conflict exists, Conflict Detection Unit 152 blocks processing of the fragment until the position conflict does not exist, i.e., a pending write to the source read position is completed.

In a first embodiment the first portion of Input 701 is the position and the buffer identifier is the second portion of Input 701. In a second embodiment the first portion of Input 701 is the buffer identifier and the second portion of Input 701 is the position. In a third embodiment the first portion of Input 701 is the buffer identifier and the position and the second portion of Input 701 is a logic true. In the third embodiment Compare 725 is omitted and Output 703 is the output of Storage 720.

Storage 720 has a limited number of entries that may vary from one embodiment to another. When all of the entries are allocated and a destination write request is received requiring an unused entry, Hash Unit 710 does not accept any new requests or confirmations on Input 701 until an entry in Storage 720 becomes available. In a highly-parallel system, capable of processing thousands of samples an embodiment of Conflict Detection Unit 152 including Hash Unit 710 may become an expensive solution because it requires storage of thousands of entries for optimal performance. An alternate embodiment relies on using coverage mask data to track pending writes for fragments being processed in Fragment Processor 155, as described further herein.

FIG. 8A illustrates Display 330 partitioned into tiles, such as Tile 805 in accordance with one or more aspects of the present invention. Each pixel within Display 330 is associated with an x,y position relative to a display origin. Each tile is associated with an x,y position, e.g., tile origin, corresponding to a number of high-order bits of x and a number of high-order bits of y. Likewise, a Pixel 810 within Tile 805 is associated with an x,y position, e.g., pixel tile position, relative to the tile origin of Tile 805. Each pixel tile position corresponds to a number of low-order bits of x and a number of low-order bits of y. Therefore, a pixel position within Display 330 may be identified by an x,y position or a combination of a tile origin and a pixel tile position. In an alternate embodiment Display 330 is replaced by an image which is partitioned into tiles.

A coverage mask may be stored for each tile, the coverage mask representing pending writes for each pixel tile position within the tile. In some embodiments the coverage mask may represent pending writes for a group of pixel tile positions within the tile. In addition to a tile origin, each tile may also have a unique tile number as an identifier. In some embodiments the tile number may be the same as the tile origin.

FIG. 8B is a block diagram of one embodiment of Conflict Detection Unit 152 in accordance with one or more aspects of the present invention. Conflict Detection Unit 152 receives an Input 851 and another input from Write Interface 157 and produces an output to Fragment Processor 155 and a Stall 863. Input 851 may include an x,y position (source location or destination location), a buffer identifier, and a coverage mask. The input from Write Interface 157 includes a tile clear signal including a tile number corresponding to the tile to be cleared.

A storage resource, Tile Lookup Unit 850 receives the tile origin included in the x,y position and outputs a corresponding tile number to a Control Unit 860. In an alternate embodiment the tile number equals the tile origin, Tile Lookup Unit 850 is omitted, and the tile origin is received by Control Unit 860. When Tile Lookup Unit 850 does not include an entry for each tile within an image or Display 330, i.e. the tile resolution exceeds the number of entries in Tile Lookup Unit 850, Tile Lookup Unit 850 outputs a match signal indicating whether or not the tile origin matches the contents of an entry. When the match signal indicates the tile origin matches the contents of an entry, Tile Lookup Unit 850 also outputs a tile number corresponding to the entry, e.g., entry address, to Control Unit 860. In one embodiment Tile Lookup Unit 850 is a content addressable memory (CAM).

Control Unit 860 outputs a write signal to Tile Lookup Unit 850 to write an entry in Tile Lookup Unit 850, effectively allocating an entry to a tile corresponding to the tile origin. Control Unit 860 also outputs a signal, Stall 863, indicating whether or not Conflict Detection Unit 152 may accept another Input 851, as described further herein in relation to FIG. 8C. Control Unit 860 outputs read and write requests to a storage resource, Tile Storage Unit 855. Tile Storage Unit 855 stores coverage mask data for each of the tiles that are stored in Tile Lookup Unit 850. Tile Storage Unit 855 receives the pixel position portion of Input 851 from Control Unit 860 when the match signal indicates the tile number matches an entry in Tile Lookup Unit 850. Tile Storage Unit 855 outputs the coverage mask corresponding to the pixel position to Control Unit 860. Control Unit 860 receives tile clear commands, including a tile number, from Write Interface 157 and clears the entry in Tile Lookup Unit 850 corresponding to the tile number and clears the coverage mask data stored in Tile Storage Unit associated with the tile number. Control Unit 860 also writes coverage mask data to Tile Storage Unit 855 to modify the coverage mask data and outputs commands to Fragment Processor 155, as described further herein. In an alternate embodiment Tile Lookup Unit 850 and Tile Storage Unit 855 are combined in one storage resource.

Control Unit 860 produces tokens that are output via Fragment Processor 155. The commands are determined based on the state of a tile, the coverage mask data stored in Tile Storage Unit 855, Input 851, and the tile clear signal. The tile state for each tile may be stored in Tile Storage Unit 855 and the tile state may be one of; CLEARING, EMPTY, ACTIVE, and FLUSH. In an alternate embodiment the tile state for each tile is stored in Tile Lookup Unit 850. The tile state for each tile is initialized to CLEARING.

When a first fragment including an x,y position and coverage mask data, is received by Conflict Detection Unit 152 an entry in Tile Lookup Unit 850 is allocated to track x,y positions within the tile. The tile state for the tile is changed from CLEARING to ACTIVE. When a second fragment is received and the second fragment conflicts with the first fragment, i.e., the second fragment requires source data read from the x,y position of the first fragment, the tile state is changed from ACTIVE to FLUSH and Control Unit 860 within Conflict Detection Unit 152 outputs a flush token to Read Interface 153. The flush token includes the tile number and the flush token is passed through Fragment Processor 155 and returns to Control Unit 860 within Conflict Detection Unit 152 as a clear tile signal, also including the tile number. The clear tile signal is returned by Raster Operation Unit 165 after any writes preceeding the flush token are written to memory via Raster Operation Unit 165. Control Unit 860 changes the tile state for a tile from FLUSH to EMPTY when a clear tile signal including the tile number for the tile is received from Raster Operation Unit 165.

FIG. 8C is a flow diagram of method steps for detecting position conflicts during fragment processing, in accordance with one embodiment of the present invention. In step 815 Conflict Detection Unit 152 receives a quad associated with an x,y position. As previously described the x,y position includes a tile origin and pixel tile position. A quad is four pixels arranged in a 2×2 square. In step 815 Conflict Detection Unit 152 also receives a four bit coverage mask indicating which of the four pixels are within a primitive. In an alternate embodiment, a quad includes fewer or more pixels and the number of coverage mask bits is scaled accordingly. In step 817 Control Unit 860 receives the match signal from Tile Lookup Unit 850. If the match signal indicates the tile origin matches the contents of an entry in Tile Lookup Unit 850, then in step 819 Control Unit 860 determines if the tile state is set to FLUSH, and, if so, Control Unit 860 proceeds to step 831. If, in step 817 Control Unit 860 determines the match signal indicates the tile origin, then in step 818 Control Unit 860 waits for the tile state of a tile to become EMPTY, indicating an entry in Tile Lookup Unit 850 is available. Control Unit 860 asserts Stall 863 while waiting for the tile state of a tile to become EMPTY, not accepting new data on Input 851. When Stall 863 is asserted, Rasterizer 150 does not output additional fragments to Conflict Detection Unit 152.

If, in step 819 Control Unit 860 determines the tile state is not set to FLUSH, then in step 821 Control Unit 860 determines if the tile state is set to ACTIVE. If the tile state is set to ACTIVE, Control Unit 860 proceeds to step 823. In step 823 Control Unit 860 compares the coverage mask data read from Tile Storage Unit 855 with the coverage mask data received from Input 851. In step 825 Control Unit 860 determines if the comparison indicates there is any overlap, and, if so, in step 829 Control Unit 860 sets the tile state to FLUSH and outputs a flush token to Fragment Processor 155.

In step 831, following either step 819 or step 829, Control Unit 860 waits for the tile state to become EMPTY and then proceeds to step 833. Control Unit 860 asserts Stall 863 while waiting for the tile state to become EMPTY, thereby not accepting new data on Input 851. If, in step 821 Control Unit 860 determines the tile state is not set to ACTIVE, i.e., the tile state is set to EMPTY, then in step 833 Control Unit 860 sets the tile state to ACTIVE, writes the tile origin in the entry in Tile Lookup Unit 850 (if the tile origin has changed) thereby allocating the entry to the tile origin, and writes the coverage mask data received via Input 851 into Tile Storage Unit 855. In step 835 Control Unit 860 determines if all of the tile entries in Tile Lookup Unit 850 are allocated and the tile states are all set to ACTIVE, i.e. if there isn't an EMPTY tile or a tile with a tile state of FLUSH. If, in step 835, Control Unit 860 determines all of the tile entries are not allocated or all of the tile entries are allocated and at least one tile state is not set to ACTIVE, Control Unit 860 proceeds to step 839. Otherwise, Control Unit 860 proceeds to step 837.

In step 837 Control Unit 860 identifies the least recently used (LRU) entry in Tile Lookup Unit 850 and outputs a flush token to Read Interface 153, the flush token including the tile number corresponding to the LRU entry and proceeds to step 839. If, in step 825, Control Unit 860 determines the comparison indicates there is not any overlap, then in step 827 Control Unit 860 updates the coverage mask data stored in Tile Storage Unit 855 by writing a combination, e.g., bitwise OR, of the coverage mask data read from Tile Storage Unit 855 and the coverage mask data received via Input 851. In step 839 Conflict Detection Unit 153 passes the x,y position to Read Interface 153 for further processing.

An embodiment of Conflict Detection Unit 153 configured to use coverage mask data to track pending writes for fragments may include fewer storage resources than an embodiment including Hash Unit 710. Furthermore, the number of pixels represented by a tile may vary from one embodiment to another. Likewise the size of storage resources Tile Lookup Unit 850 and Tile Storage Unit 855 may be sized to store each tile within an image or Display 330 or to store a small number of tiles. Increasing the size of the storage resources may reduce the number of clock cycles spent waiting for a tile to become available for allocation, thereby improving fragment processing throughput of Fragment Processor 155.

FIG. 9A is a block diagram of one embodiment of Conflict Detection Unit 152 in accordance with one or more aspects of the present invention. In addition to Tile Lookup Unit 850, Tile Storage Unit 855, and Control Unit 860, the embodiment shown in FIG. 9A includes an issue timestamp (ITS) Unit 970 and a retire timestamp (RTS) Unit 975. ITS Unit 970 and RTS Unit 975 are used during the generation of interlock tokens, as described further herein. Specifically, the use of timestamps permits more than one "in-flight" interlock token to be within Fragment Processor 155 for each tile stored in Tile Lookup Unit 850. The embodiment of Conflict Detection Unit 152 illustrated in FIG. 8B only permits one in-flight flush token (similar to the interlock token) for each tile. Permitting multiple in-flight interlock tokens may further reduce the number of clock cycles spent waiting for a tile to become available for allocation, thereby improving fragment processing throughput of Fragment Processor 155.

In this embodiment of Conflict Detection Unit 152 Control Unit 860 generates and outputs an interlock token to Read Interface 153 for every n quads received via Input 851. In one embodiment n is equal to 32. In other embodiments n may be greater than or less than 32. ITS Unit 970 increments an issue-timestamp whenever an interlock token is output. The interlock token passes through Fragment Processor 155 to Raster Operation Unit 165 and an acknowledgement (ack) is output by Write Interface 157 within Raster Operation Unit 165 when all of the reads and writes preceeding the interlock token have been output by Memory Controller 120 to Conflict Detection Unit 152. RTS Unit 975 increments a retire-timestamp whenever an ack is received via Write Interface 157. In one embodiment the issue-timestamp and the retire-timestamp are set to a predetermined value at initialization. All issue-timestamp values in Tile Storage Unit 855 are also set to the predetermined value at initialization.

In addition to coverage mask data, Tile Storage Unit 855 stores an issue-timestamp value for each tile. Whenever an x,y position is output by Control Unit 860 to Fragment Processor 155 the issue-timestamp is copied into the entry in Tile Storage Unit 855 corresponding to the tile number. The difference between the issue-timestamp and the retire-timestamp defines a timestamp (TS) window. When an issue-timestamp value stored in Tile Storage Unit 855 lies within the TS window, a quad in the tile associated with the tile number is being processed by Fragment Processor 155 or Raster Operation Unit 165. Conversely, when an issue-timestamp value stored in Tile Storage Unit 855 lies outside of the TS window, the tile number is available for allocation to an incoming quad with a tile origin that does not match an entry in Tile Lookup Unit 850.

FIG. 9B is a flow diagram of method steps for detecting position conflicts during fragment processing, in accordance with one embodiment of the present invention. In step 915 Conflict Detection Unit 152 receives a quad associated with an x,y position, including coverage mask data. In step 917 Control Unit 860 receives the match signal from Tile Lookup Unit 850. If the match signal indicates the tile origin matches the contents of an entry in the Tile Lookup Unit 850, then in step 919 Control Unit 860 reads the coverage mask data and the issue-timestamp value from the entry in Tile Storage Unit 855 corresponding to the tile number received with the match signal from Tile Lookup Unit 850 in step 917.

In step 929 Control Unit 860 determines if the issue-timestamp value read in step 919 is within the TS window, and, if not, Control Unit 860 proceeds to step 939. If, in step 929 Control Unit 860 determines the issue-timestamp value read in step 919 is within the TS window, then in step 931 Control Unit 860 compares the coverage mask data read from the entry to the coverage mask received in step 915. In step 933 Control Unit 860 determines if the comparison indicates there is any overlap, and, if so, in step 935 Control Unit 860 asserts Stall 863 indicating that Conflict Detection Unit 152 is not accepting new data on Input 851. In step 935 Control Unit 860 also signals to ITS Unit 970 to increment the issue-timestamp and outputs an interlock token via Fragment Processor 155.

In step 937 Control Unit 860 determines if the issue-timestamp value read in step 919 is still within the TS window, and, if so, Control Unit 860 remains in step 937 while asserting Stall 863 to indicate that Conflict Detection Unit 152 is not accepting new data on Input 851. If, in step 937 Control Unit 860 determines the issue-timestamp value read in step 919 is not within the TS window, then Control Unit 860 proceeds to step 939.

If, in step 917 Control Unit 860 determines the match signal indicates that the tile origin does not match the contents of an entry in Tile Lookup Unit 850, then in step 921 Control Unit 860 determines if an entry in Tile Lookup Unit 850 is available for allocation. If an entry is available, then Control Unit 860 proceeds to step 927. Otherwise, Control Unit 860 proceeds to step 923 and identifies the LRU (available) entry in Tile Lookup Unit 850, signals to ITS Unit 970 to increment the issue-timestamp, and outputs an interlock token to read Interface 153. In step 925 Control Unit 860 determines if an entry in Tile Lookup Unit 850 is available for allocation, and, if not, Control Unit 860 remains in step 925 while asserting Stall 863 to indicate that Conflict Detection Unit 152 is not accepting new data on Input 851. If, in step 925 Control Unit 860 determines an entry in Tile Lookup Unit 850 is available for allocation, then Control Unit 860 proceeds to step 927. In step 927 Control Unit 860 writes the tile origin received in step 915 (extracted from the x,y position) into the entry, thereby allocating the entry to the tile origin. In step 939 Control Unit 860 writes the coverage mask received in step 915 into the entry in Tile Storage Unit 855 associated with the tile number of the entry in Tile Lookup Unit 850. In step 939 Control Unit 860 also copies the issue-timestamp value into the entry in Tile Storage Unit 855 associated with the tile number and proceeds to step 943.

If, in step 933, Control Unit 860 determines the comparison indicates there is not any overlap, then in step 941 Control Unit 860 combines the coverage mask data read from Tile Storage Unit 855 in step 919 with the coverage mask received in step 915 to produce combined coverage mask data and writes the combined coverage mask data to the entry in Tile Storage Unit 855. In step 941 Control Unit 860 also copies the issue-timestamp from ITS Unit 970 to the entry in Tile Storage Unit 855. In step 943 Conflict Detection Unit 153 passes the x,y position received in step 915 to Fragment Processor 155 for further processing.

Figure 10A:
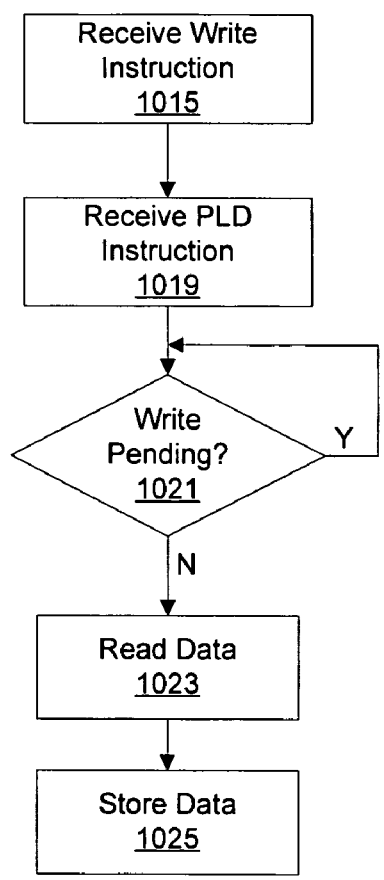
Figure 10B:
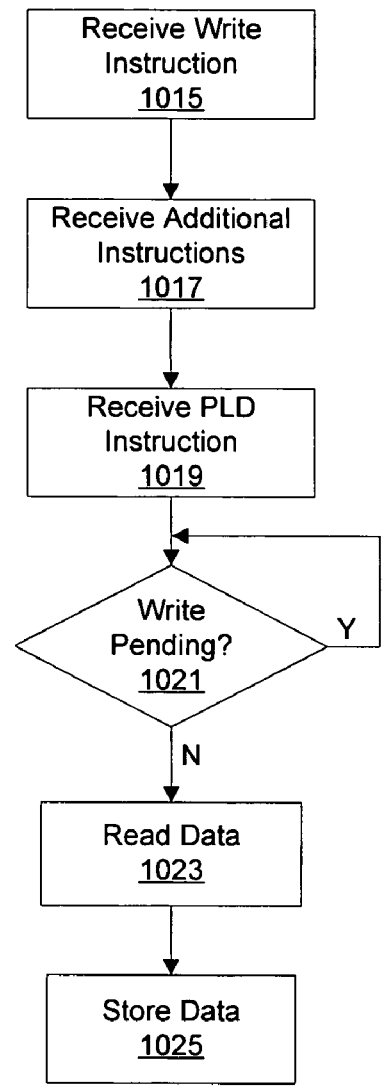
Figure 10C:
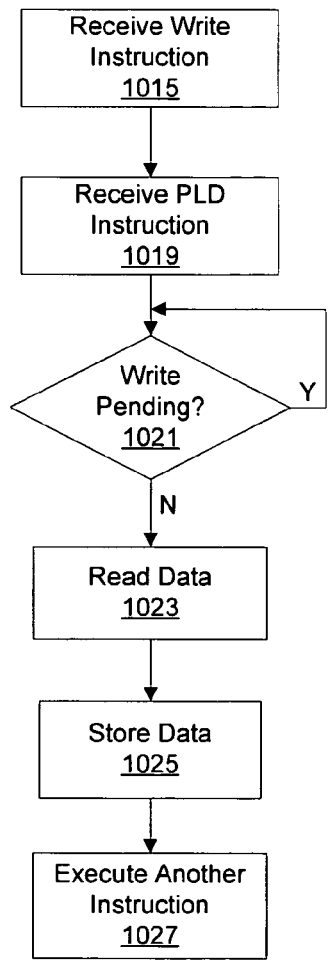

FIGS. 10A, 10B, and 10C illustrate embodiments of methods of processing fragment program instructions, including a PLD (pixel load) instruction in accordance with one or more aspects of the present invention. An API (Application Programming Interface) for a programmable graphics processor includes the PLD instruction to configure Conflict Detection Unit 152 within Programmable Graphics Processor 105 to detect a position conflict for a position and prevent a subsequent access of the position until the position conflict is resolved. In some embodiments Conflict Detection Unit 152 is located within Fragment Processor 155.

In step 1015, Conflict Detection Unit 152 receives a fragment program instruction specifying a write to a first destination location. The first destination location may be a register in Fragment Processor 155 or a location in graphics memory within a buffer. The first destination location may also include a buffer identification. The buffer may include depth data, color data, stencil data, or the like.

In step 1019, Conflict Detection Unit 152 receives a PLD instruction including a source location and a second destination location. In one embodiment the source location is the first destination location and the second destination location is Register 159. In another embodiment the source location is another location within the buffer. In yet another embodiment the source location is another location within another buffer.

In step 1021, Conflict Detection Unit 152 determines if a write to the source location is pending, and, if so, Conflict Detection Unit 152 remains in step 1021, waiting until the write to the source location is complete, i.e. for the position conflict to be resolved. Execution of the PLD instruction eliminates the need for executing a flush instruction to drain Fragment Processing Pipeline 160 prior to reading the source location.

If, in step 1021, Conflict Detection Unit 152 determines that a write to the source location is not pending, in step 1023, Read Interface 153 outputs a read request for the source location to Memory Controller 120 and receives the data stored in the source location from Memory Controller 120. In an alternate embodiment Read Interface 153 reads the data stored in the source location from Data Cache 158. In step 1025, Read Interface 153 outputs the data stored in the source location to Fragment Processing Unit 156 and Fragment Processing Unit 156 stores the data in the destination location, e.g. Register 159.

FIG. 10B illustrates an embodiment of a method of processing fragment program instructions, including the steps described in relation to FIG. 10A. In step 1015 Conflict Detection Unit 152 receives a fragment program instruction specifying a write to a first destination location. In step 1017 Conflict Detection Unit 152 receives additional fragment program instructions. The additional program instructions may include write instructions specifying other destination locations. Steps 1019, 1021, 1023 and 1025 are completed as described in relation to FIG. 10A.

In an embodiment the source location specified in the PLD instruction is the first destination location specified in the fragment program instruction received in step 1015. Execution of the PLD instruction in the embodiment permits reading the source location during processing of the additional fragment program instructions rather than draining Fragment Processor 155 after the write to the first destination location and before executing the source read. Steps 1015, 1019, 1021, 1023, and 1025 are completed as previously described.

FIG. 10C illustrates an embodiment of a method of processing fragment program instructions, including the steps described in relation to FIG. 10A. Steps 1015, 1019, 1021, 1023, and 1025 are completed as described in relation to FIG. 10A. In step 1027 Conflict Detection Unit 152 outputs another fragment program instruction to Fragment Processor 155 for execution. In the method illustrated in FIG. 10C, Fragment Processor 155 does not process the other fragment program until the PLD instruction has been executed.

Figure 10D:
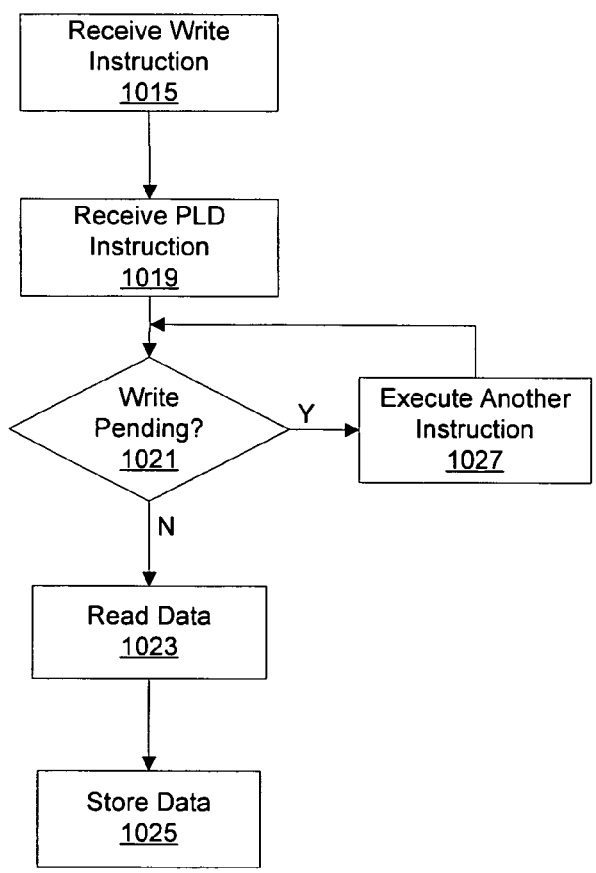

FIG. 10D illustrates a method of processing fragment program instructions using an alternate embodiment of Conflict Detection Unit 152, which permits execution of program instructions, while waiting for a write to complete before executing a PLD instruction. Steps 1015 and 1019 are completed as described in relation to FIG. 10A. In step 1021, Conflict Detection Unit 152 determines if a write to the source location is pending, and, if so, in step 1027, Conflict Detection Unit 152 outputs another (subsequent) fragment program instruction to Fragment Processor 155 for execution, permitting the subsequent fragment program instruction to effectively bypass the PLD instruction.

A subsequent fragment program instruction may only be permitted to bypass a pending fragment program instruction if the subsequent fragment program instruction does not have a data dependency on the pending fragment program instruction, i.e., the subsequent fragment program instruction does not source data that is produced by the pending fragment program instruction. After executing the subsequent fragment program instruction, Fragment Processor 155 returns to step 1021. In step 1021, Conflict Detection Unit 152 determines if a write to the source location is still pending, and, if not, steps 1023 and 1025 are completed as previously described to complete execution of the PLD instruction.

Embodiments of Conflict Detection Unit 152 that permit fragment program instructions without position conflicts to bypass fragment program instructions with position conflicts include storage resources to store the fragment program instructions with position conflicts. Conflict Detection Unit 152 outputs a stored fragment program instruction when the position conflict is removed for that fragment program instruction. Likewise, some embodiments of Conflict Detection Unit 152 include storage resources to store fragments associated with positions for which conflicts exist. When storage resources are not available, Conflict Detection Unit 152 blocks fragment processing until storage resources become available.

FIG. 11A illustrates an embodiment of a method of depth buffering prior to shading graphics data in accordance with one or more aspects of the present invention. It is desirable to minimize texture reads and computing resources by not shading any fragments that fail the depth test, i.e., which are behind another fragment. Therefore, to maximize performance and minimize unnecessary graphics memory reads it is desirable to perform depth buffering prior to shading. The PLD instruction may be used to configure Fragment Processor 155 to perform depth buffering prior to shading.

In step 1101 Fragment Processor 155 is configured by fragment program instructions to compute the fragment depth value of a fragment for a position. In step 1103 Texture Unit 154 reads a depth buffer value for the position. The read is performed using a PLD instruction, i.e., Conflict Detection Unit 152 detects any position conflicts and the read is not performed until any detected position conflicts are resolved. The depth buffer value read is stored in Register 159. In step 1105 Texture Unit 154 outputs the depth buffer value and the fragment depth value to Fragment Processing Unit 156. Fragment Processing Unit 156 is configured by the fragment program instructions to determine if the fragment depth value will be written to the depth buffer. For example, in one embodiment, the fragment will be written to the depth buffer when the fragment depth value is nearer to the viewpoint than the depth buffer value at the position. If, in step 1105, Fragment Processing Unit 156 determines the fragment depth value will be written to the depth buffer, then, in step 1109, Fragment Processing Unit 156 is configured by the fragment program instructions to produce a computed fragment color.

In step 1111, Fragment Processor 155 determines if the fragment program instructions specify to read a buffer, such as a texture map, to compute a shaded fragment color, and, if so, the fragment is processed in an additional pass within Fragment Processor 155. In step 1113, Texture Unit 154 is configured by the fragment program instructions to read buffer data from the buffer and output the buffer data to Fragment Processing Unit 156. In step 1115, Fragment Processing Unit 156 is configured by the fragment program instructions to shade the fragment using the computed fragment color and the buffer data to produce a shaded fragment color. If, in step 1111, Fragment Processor 155 determines the fragment program instructions do not specify to read a buffer, then the computed fragment color is the shaded fragment color and Fragment Processor 155 proceeds to step 1116.

In step 1116, Fragment Processor 155 determines if blending is enabled, and if not, Fragment Processor 155 proceeds to step 1121. If, in step 1116, Fragment Processor 155 determines that blending is enabled, then in step 1117, the shaded fragment color, configuration control, and fragment depth value are output by Fragment Processor 155 to Raster Operation Unit 165. Raster Operation Unit 165 reads a color from a buffer, such as a color buffer, for the position. In step 1119 Raster Operation Unit 165 is configured by the fragment program instructions to blend the color read from the color buffer with the shaded fragment color to produce a blended color. In step 1121, Write Interface 157 within Raster Operation Unit 165 writes the blended color and the fragment depth value to the color buffer and the depth buffer, respectively. In an alternate embodiment, the color data and the depth data are stored in a buffer containing color and depth in each location within the buffer.

In step 1123, Fragment Processor 155 determines if another fragment will be processed, and, if so, returns to step 1101. In step 1101 Fragment Processor 155 is configured by fragment program instructions to compute the fragment depth value of another fragment for another position. In step 1103 Texture Unit 154 reads a depth buffer value for the other position. The read is performed using the PLD instruction, and the depth buffer value read is stored in Register 159. Because Fragment Processor 155 is pipelined, processing of the other fragment may begin before processing of the fragment is completed. Therefore, the PLD instruction should be used to detect and avoid RAW position conflicts. When the PLD instruction is not used, Fragment Processing Pipeline 160 may be flushed using an instruction to assure processing of the other fragment does not begin until the processed fragment is output to graphics memory. Flushing should be minimized to effectively utilize computing resources within Fragment Processing Pipeline 160 and to maximize fragment throughput.

In step 1105, Fragment Processing Unit 156 receives the depth buffer value read in step 1103 and the fragment depth value computed in step 1101. Fragment Processing Unit 156 is configured by the fragment program instructions to determine if the fragment depth value will be written to the depth buffer. If, in step 1105, Fragment Processing Unit 156 determines the fragment depth value will not be written to the depth buffer, then, in step 1123 Fragment Processor 155 determines if another fragment will be processed, and, if not, in step 1131 Output Controller 180 reads the color buffer for output to Output 185, such as a display or the like. In an alternative embodiment, the color buffer is output via either Graphics Interface 117 or Output Controller 180 to a film recording device or written to a peripheral device, e.g., disk drive, tape, compact disk, or the like.

FIG. 11B illustrates an embodiment of a method of depth peeling in accordance with one or more aspects of the present invention. Depth peeling is a method of rendering an image without sorting (by depth) the fragments prior to rendering. Each fragment within an image is processed by Fragment Processing Pipeline 160 to determine the front-most depth value and color for each position within the image. The front-most depth value and color are stored in either a first buffer containing depth and color or in two buffers, one containing color (a first color buffer) and one containing depth (a first depth buffer). Each fragment is optionally processed by Fragment Processing Pipeline 160 during a number of additional passes through Graphics Processing Pipeline 103. Each additional pass determines the "next" front-most fragment layer in the image, storing depths of the next front-most layer in a second depth buffer and storing colors of the next front-most layer in a second color buffer. When applying depth peeling for order-independent transparency, each next front-most layer is optionally blended with the front-most layer(s) at the end of each additional pass. In an alternative embodiment, the second color buffer stores colors of the next front-most layer blended with the front-most colors.

At the end of the first additional pass through Graphics Processing Pipeline 103 the second color buffer contains the image color for the first two layers of fragments. A second additional pass through Graphics Processing Pipeline 103 may be completed, storing a next front-most depth in the first depth buffer and a blended color for the first three layers of fragments in the first color buffer. Likewise, further additional passes through Graphics Processing Pipeline 103 may be completed either reading from the first depth and color buffers and writing to the second depth and color buffers or reading from the second depth and color buffers and writing to the first depth and color buffers. The PLD instruction is used during depth peeling to improve fragment processing throughput so that Fragment Processing Pipeline 160 does not need to be flushed between each pass to avoid position conflicts.

Steps 1101, 1103, and 1105 are completed as described in relation to FIG. 11A. If, in step 1105 Fragment Processing Unit 156 determines the fragment depth value will be written to the depth buffer in step 1114 Fragment Processing Unit 156 is configured by the fragment program instructions to produce a shaded fragment color. Step 1114 includes steps 1109, 1111, 1113, and 1115 shown in FIG. 11A. In step 1121 Write Interface 157 within Raster Operation Unit 165 writes the shaded fragment color and the fragment depth value to the first color buffer and the first depth buffer respectively.

In step 1123 Fragment Processor 155 determines if another fragment will be processed, and, if so, returns to step 1101. In step 1101 Fragment Processor 155 is configured by fragment program instructions to compute the fragment depth value of another fragment for another position. In step 1103 Texture Unit 154 reads a depth buffer value for the other position. In step 1105, Fragment Processing Unit 156 receives the depth buffer value read in step 1103 and the fragment depth value computed in step 1101. Fragment Processing Unit 156 is configured by the fragment program instructions to determine if the fragment depth value will be written to the first depth buffer. If, in step 1105 Fragment Processing Unit 156 determines the fragment depth value will not be written to the first depth buffer, then in step 1123 Fragment Processor 155 determines if another fragment will be processed, and, if so Fragment Processor 155 returns to step 1101. If, in step 1123, Fragment Processor 155 determines another fragment will not be processed, then in step 1125, Fragment Processor 155 determines if this is the first pass through Graphics Processing Pipeline 103. If, in step 1125, Fragment Processor 155 determines this is the first pass through Graphics Processing Pipeline 103, then in step 1129, Graphics Processing Pipeline 103 determines if another pass through Graphics Processing Pipeline 103, the first additional pass, will be completed to determine the next front-most fragment layer within the image. If, in step 1129, Graphics Processing Pipeline 103 determines another pass will be completed, Fragment Processor 155 returns to step 1101. Prior to starting the first additional pass, the second depth buffer is initialized to the furthest depth value to determine the next front-most fragment layer which lies between the front-most layer and the furthest depth value.

In step 1101 Fragment Processor 155 is configured by fragment program instructions to compute the fragment depth value of a fragment for a position. In step 1103 Texture Unit 154 reads depth buffer values for the position from the first depth buffer and the second depth buffer. The read of the second depth buffer (the first depth buffer is read-only for this pass) is performed using the PLD instruction and the depth buffer value read (next front-most) is optionally stored in Register 159. The depth buffer value read from the first depth buffer may also be stored in a register, like Register 159, within Fragment Processing Unit 156.

In step 1105, Fragment Processing Unit 156 receives the front-most depth buffer value read from the first depth buffer in step 1103, the next front-most depth buffer value read from the second depth buffer in step 1103, and the fragment depth value computed in step 1101. Fragment Processing Unit 156 is configured by the fragment program instructions to determine if the fragment depth value will be written to the depth buffer. For example, the fragment will be written to the depth buffer when the fragment depth value is nearer to the viewpoint than the next front-most depth buffer value at the position and further from the viewpoint than the front-most depth buffer value at the position. If, in step 1105, Fragment Processing Unit 156 determines the fragment depth value will be written to the second depth buffer, then in step 1114, Fragment Processing Unit 156 is configured by the fragment program instructions to produce a shaded fragment color.

In step 1121 the shaded fragment color and fragment depth value are output by Fragment Processor 155 to Raster Operation Unit 165 and Raster Operation Unit 165 writes the shaded fragment color and fragment depth value to the second color buffer and the second depth buffer, respectively. In an alternative embodiment, in step 1121, Raster Operation Unit 165 reads a color from the first color buffer for the position and Raster Operation Unit 165 is configured by the fragment program instructions to blend the color read from the first color buffer with the shaded fragment color to produce a blended color. In the alternative embodiment, Write Interface 157 within Raster Operation Unit 165 writes the blended color and the fragment depth value to the second color buffer and the second depth buffer respectively.

In step 1123, Fragment Processor 155 determines if another fragment will be processed, and, if so, returns to step 1101. In step 1101, Fragment Processor 155 is configured by fragment program instructions to compute the fragment depth value of another fragment for another position. In step 1105, Fragment Processing Unit 156 receives the front-most depth buffer value read from the first depth buffer in step 1103, the next front-most depth buffer value read from the second depth buffer in step 1103, and the fragment depth value computed in step 1101. The read of the second depth buffer is performed using the PLD instruction and the depth buffer value read (next front-most) is stored in Register 159. The depth buffer value read from the first depth buffer may also be stored in a register, like Register 159, within Fragment Processing Unit 156. Fragment Processing Unit 156 is configured by the fragment program instructions to determine if the fragment depth value will be written to the depth buffer. If, in step 1105, Fragment Processing Unit 156 determines the fragment depth value will not be written to the second depth buffer, then in step 1123, Fragment Processor 155 determines if another fragment will be processed. If, in step 1123, Fragment Processor 155 determines another fragment will not be processed, then in step 1125, Fragment Processor 155 determines if this is the first pass through Graphics Processing Pipeline 103.

If, in step 1125, Fragment Processor 155 determines this is not the first pass through Graphics Processing Pipeline 103, then in step 1127, Fragment Processor 155 blends the front-most (first) color buffer with the next front-most (second) color buffer and stores the blended color buffers in the second color buffer. In step 1129 Graphics Processing Pipeline 103 determines if another pass will be completed to process the next front-most layer of fragments in the image. If, in step 1129 Graphics Processing Pipeline 103 determines another pass will be completed, then steps 1101, 1103, 1105, 1114, 1121, 1123, and 1125 are repeated with the second depth and color buffers containing the front-most layers (read-only) and writing the third layer to the first depth and color buffers.

If, in step 1125 Graphics Processing Pipeline 103 determines another pass through Graphics Processing Pipeline 103 will not be completed, then in step 1131, Output Controller 180 reads the first or second color buffer, whichever was written during the last pass, for output to Output 185, such as a display or the like. In an alternative embodiment, the color buffer is output via either Graphics Interface 117 or Output Controller 180 to a film recording device or written to a peripheral device, e.g., disk drive, tape, compact disk, or the like.

FIG. 11C illustrates another embodiment of a method of depth peeling in accordance with one or more aspects of the present invention. This embodiment uses a depth and a color buffer (or a combined depth and color buffer) for each layer and includes some of the steps described in relation to FIGS. 11A and 11B. In contrast to the method described in relation to FIG. 11B, sorting of the layers is completed in a single extra pass through Graphics Processing Pipeline 103. After the layers have been sorted Fragment Processor 155 blends the layers to produce an image for output. Alternatively, the layers are blended by Raster Operation Unit 165 to produce the image for output. The PLD instruction is used to improve fragment processing throughput so that Fragment Processing Pipeline 160 does not need to be flushed during the single extra pass through Graphics Processing Pipeline 103 to avoid position conflicts. In some embodiments the four front-most layers are stored to generate the image for output. In an alternate embodiment, Raster Operation Unit 165 performs the sorting of the layers.

In step 1101 Fragment Processor 155 is configured by a fragment program to compute the fragment depth value of a fragment for a position. In step 1103 Texture Unit 354 reads depth buffer values for the position from each depth buffer storing a layer of depth values for the image as specified by a fragment program. In step 1104 Fragment Processor 155 determines if the layers need to be reordered. For example, the layers need to be reordered if the fragment depth value is between the depth values in layer 1 and the depth value in layer 2, where layer 1 is the front-most layer. The fragment depth value in layer 2 is moved to layer 3 and the fragment depth value will be written to layer 2. If layer 3 has not been used, an output buffer identifier will be assigned to layer 3 and each memory location in the layer 3 depth buffer is initialized to the furthest depth value. Likewise, each memory location in the layer 3 color buffer is initialized to transparent black.

If, in step 1104, Fragment Processor 155 determines if the layers need to be reordered, in step 1106 Fragment Processor 155 determines the output buffer identifier associated with each depth value that is moved from one depth buffer (layer) to another depth buffer (layer) during reordering. Fragment Processor 155 also determines the output buffer identifier associated with the fragment depth value. Likewise, Fragment Processor 155 determines the output buffer identifier associated with each color value that is moved from one color buffer to another color buffer during reordering.

If, in step 1104, Fragment Processor 155 determines the layers do not need to be reordered, Fragment Processor 155 proceeds to step 1114. For example, the layers do not need to be reordered if the fragment depth value is behind the depth value in layer 1 and the depth value in layer 2, where layer 1 is the front-most layer. The fragment depth value will be written to unused layer 3 and an output buffer identifier will be assigned to layer 3. In step 1114, Fragment Processing Unit 156 is configured by the fragment program to produce a shaded fragment color for the fragment.

In step 1120, Fragment Processing Unit 156 outputs configuration control, the fragment depth value, depth buffer identifier, shaded fragment color, color buffer identifier, and reordered data to Raster Operation Unit 165. In one embodiment, the reordered data includes additional depth and color buffer identifiers corresponding to reordered layers of color and depth values. The additional depth buffer identifiers are used by Raster Operation Unit 165 to read the depth buffer values reordered in step 1106. Likewise, the additional color buffer identifiers are used by Raster Operation Unit 165 to read the color buffer values reordered in step 1106. In another embodiment, the reordered data includes reordered color values and color buffer identifiers and reordered depth values and depth buffer identifiers.

In step 1114, Raster Operation Unit 165 writes the shaded fragment color to the color buffer corresponding to the color buffer identifier. Raster Operation Unit 165 writes the fragment depth value to the depth buffer corresponding to the depth buffer identifier. Raster Operation Unit 165 also writes each additional depth value reordered in step 1106 to each depth value's associated depth buffer corresponding to each depth value's color buffer identifier determined in step 1106. Likewise, Raster Operation Unit 165 also writes each additional color value reordered in step 1106 to each color value's associated color buffer corresponding to each color value's color buffer identifier determined in step 1106.

In step 1123, Fragment Processor 155 determines if another fragment will be processed, and, if so, steps 1101, 1103, 1104, 1106, 1114, and 1120 are repeated. If, in step 1123, Fragment Processor 155 determines another fragment will not be processed, depth sorting and shading of all of the fragments in the image is complete. In step 1124, each color buffer containing a layer is read by Raster Operation Unit 165. In step 1126 each position in each color buffer is blended by Raster Operation Unit 165 to produce a blended color buffer. In one embodiment the color buffers are read and the color values for each position are blended from a back-to-front order to produce a blended color value for each position. In another embodiment the color buffers are read and the color values for each position are blended from a front-to-back order to produce a blended color value for each position. In yet another embodiment, Texture Unit 354 reads the color buffers and Fragment Processing Unit 356 blends the color values for each position and outputs a blended color value for each position to Raster Operation Unit 165.

In step 1128 Raster Operation Unit 165 writes the blended color values to an output buffer (color buffer). The output buffer may be one of the color buffers read in step 1124. In step 1132 Output Controller 180 reads the output buffer for output to Output 185, such as a display or the like. In an alternative embodiment, the output buffer is output via either Graphics Interface 117 or Output Controller 180 to a film recording device or written to a peripheral device, e.g., disk drive, tape, compact disk, or the like.

In further embodiments of methods of processing graphics data, the PLD instruction may be used to perform frame buffer blending, floating-point raster operations, dual depth shadow mapping, and the like, using Fragment Processing Pipeline 160.

FIG. 12A is an alternate embodiment of Computing System 100 in accordance with one or more aspects of the present invention. In this embodiment Programmable Graphics Processor 105 includes, among other components, a Front End 1230 that receives commands from Host Computer 110 via Graphics Interface 117. Front End 1230 interprets and formats the commands and outputs the formatted commands and data to an Index Processor 1235. Some of the formatted commands are used by a Programmable Graphics Processing Pipeline 1250 to initiate processing of data by providing the location of program instructions or graphics data stored in memory. Index Processor 1235, Programmable Graphics Processing Pipeline 1250 and Raster Operation Unit 165 each include an interface to Memory Controller 120 through which program instructions and data may be read from graphics memory.

Index Processor 1235 optionally reads processed data, e.g., data written by Raster Operation Unit 165, from graphics memory and outputs the data, processed data and formatted commands to Programmable Graphics Processing Pipeline 1250. Programmable Graphics Processing Pipeline 1250 and Raster Operation Unit 165 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable Graphics Processing Pipeline 1250 and Raster Operation Unit 165 are each optionally configured such that data processing operations are performed in multiple passes through those units or in multiple passes within Programmable Graphics Processing Pipeline 1250.

In one embodiment Programmable Graphics Processing Pipeline 1250 performs geometry computations, rasterization, and pixel computations. Therefore, Programmable Graphics Processing Pipeline 1250 is programmed to operate on surface, primitive, vertex, fragment, pixel, sample, or any other data.

FIG. 12B is a block diagram of an exemplary embodiment of Programmable Graphics Processing Pipeline 1250 in accordance with one or more aspects of the present invention. Samples, such as surfaces, primitives, or the like, are received from Index Processor 1235 by Programmable Graphics Processing Pipeline 1250 and stored in a Vertex Input Buffer 1220 in a register file, FIFO (first in first out) memory, cache, or the like (not shown). The samples are broadcast to Execution Pipelines 1240, four of which are shown in FIG. 12B. An alternate embodiment may include either more or fewer Execution Pipelines 1240. Each Execution Pipeline 1240 includes at least one multithreaded processing unit. The samples output by Vertex Input Buffer 1220 may be processed by any one of the Execution Pipelines 1240. A sample is accepted by an Execution Pipeline 1240 when a processing thread within the Execution Pipeline 1240 is available.

Execution Pipelines 1240 may receive first samples, such as higher-order surface data, and tessellate the first samples to generate second samples, such as vertices. Execution Pipelines 1240 may be configured to transform the second samples from an object-based coordinate representation (object space) to an alternatively based coordinate system such as world space or normalized device coordinates (NDC) space. Each Execution Pipeline 1240 communicates with Texture Unit 154 using Read Interface 153 to read program instructions and graphics data stored in buffers in graphics memory via Memory Controller 120. An optional Data Cache 158 within Texture Unit 154 is used to improve memory read performance by reducing read latency. In another alternate embodiment, a Texture Unit 154 is included in each Execution Pipeline 1240. In yet another alternate embodiment, program instructions are stored within Programmable Graphics Processing Pipeline 1250.

Execution Pipelines 1240 output processed samples, such as vertices, that are stored in a Vertex Output Buffer 1260 in a register file, FIFO memory, cache, or the like (not shown). Processed vertices output by Vertex Output Buffer 1260 are received by a Primitive Assembly/Setup 1205. Primitive Assembly/Setup 1205 calculates parameters, such as deltas and slopes, for rasterizing the processed vertices. Primitive Assembly/Setup 1205 outputs parameters and samples, such as vertices, to Raster Unit 1210. The Raster Unit 1210 performs scan conversion on samples and outputs fragments to a Pixel Input Buffer 1215.

A graphics program (vertex program or fragment program) is executed within one or more Execution Pipelines 1240 as a plurality of threads where each vertex or fragment to be processed by the program is assigned to a thread. Although threads share processing resources within Programmable Graphics Processing Pipeline 1250 and graphics memory, the execution of each thread proceeds in the one or more Execution Pipelines 1240 independent of any other threads. A RAW position conflict may exist when a fragment program specifies to write to a position in a buffer that the fragment program later specifies to read from. Likewise, a RAW position conflict may exist when a fragment program specifies to write to a position in a buffer that a subsequent fragment program specifies to read from. Furthermore, because threads are executed independently, RAW conflicts may exist when a thread executes a write to a position in a buffer that the thread or another thread executes a read from.

In order to eliminate the need to track RAW conflicts between two or more Execution Pipelines 1240, each Execution Pipeline 1240 is configured to process fragments for at least one specific destination location. For example, an Execution Pipeline 1240 is configured to process fragments corresponding to any destination location within a contiguous region, e.g. (x,y) position, scanline, tile, or the like. In another example, an Execution Pipeline 1040 is configured to process fragments corresponding to any destination location modulo n vertically and modulo m horizontally, e.g., one (x,y) position in each tile, every mth (x,y) position in a scanline, and the like. Texture Unit 154 includes Conflict Detection Unit 152 to track pending destination write operations in order to detect and avoid RAW position conflicts. Alternatively, each Execution Pipeline 1240 includes a Conflict Detection Unit 152. Furthermore, if execution of a thread is blocked because of a RAW position conflict, some embodiments may permit execution of one or more other threads that do not have position conflicts, thereby improving throughput.

Pixel Input Buffer 1215 receives fragments from Raster Unit 1010 and outputs the fragments to each Execution Pipeline 1240. The fragments, output by Pixel Input Buffer 1215, are each processed (as in Fragment Processing Unit 156) by only one of the Execution Pipelines 1240. Pixel Input Buffer 1215 determines which one of the Execution Pipelines 1240 to output each fragment to depending on a position, e.g., (x,y), associated with each sample. In this manner, each fragment is output to the Execution Pipeline 1240 designated to process fragments associated with the position.

Each Execution Pipeline 1240 signals to Pixel Input Buffer 1240 when a fragment can be accepted or when a fragment cannot be accepted. Fragment program instructions associated with a thread configure at least one multi-threaded processing unit within an Execution Pipeline 1240 to perform operations such as texture mapping, shading, blending, and the like. Processed fragments are output from each Execution Pipeline 1040 to a Pixel Output Buffer 1270. Pixel Output Buffer 1270 optionally stores the processed samples in a register file, FIFO memory, cache, or the like (not shown). The processed samples are output from Pixel Output Buffer 1270 to Raster Operation Unit 165.

Execution Pipelines 1240 are optionally configured using program instructions read by Texture Unit 154 such that data processing operations are performed in multiple passes through at least one multithreaded processing unit within Execution Pipelines 1240.

FIG. 12C is another block diagram of an exemplary embodiment of Programmable Graphics Processing Pipeline 1250 in accordance with one or more aspects of the present invention. In this embodiment each Execution Pipeline 1240 may process fragments associated with any position. Each fragment output by Pixel Input Buffer 1215 is processed by an available Execution Pipeline 1040. Conflict Detection Unit 152 is included in Pixel Input Buffer 1215 instead of in either Texture Unit 154 or each Execution Pipeline 1240.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A method of avoiding a position conflict during fragment shading, comprising:
    partitioning an image into tiles, each tile associated with a unique tile origin;
    allocating an entry in at least one storage resource to a tile origin, the entry specified by a tile number;
    storing a portion of a position associated with at least one fragment in the entry, wherein the at least one fragment is produced by a graphics primitive intersecting a pixel within a tile identified by the tile number;
    outputting a token when a position conflict is detected within the tile; and
    delaying processing of a fragment that corresponds to the position conflict.

2. The method of claim 1, further comprising storing a coverage mask associated with the at least one fragment in the entry.

3. The method of claim 1, further comprising storing a tile state in the entry.

4. The method of claim 1, further comprising storing a timestamp value in the entry.

5. The method of claim 2, further comprising:
combining the coverage mask associated with the at least one fragment with coverage mask data associated with at least one other fragment to produce combined coverage mask data; and
storing the combined coverage mask data in the entry.

6. The method of claim 1, wherein the number of entries in the at least one storage resource is less than the number of tiles in the image.

7. The method of claim 1, further comprising outputting the position associated with at least one fragment when a position conflict does not exist.

8. The method of claim 1, further comprising outputting a token when a predetermined number of quads are received.

9. The method of claim 8, further comprising updating a timestamp when the token is output.

10. A conflict detection unit configured to detect position conflicts during fragment shading, comprising:
at least one storage resource including entries configured to store tile origins and coverage mask data; and
a control unit configured to determine whether or not a position conflict exists during fragment shading within a tile associated with a tile origin stored in the at least one storage resource and output a stall signal indicating whether or not the conflict detection unit will accept new data.

11. The conflict detection unit of claim 10, wherein the control unit is configured to output a token when a position conflict is detected.

12. The conflict detection unit of claim 10, wherein the control unit is configured to output a token when all of the entries within the at least one storage resource are allocated.

13. The conflict detection unit of claim 10, wherein the control unit is configured to output a token when a predetermined number of quads are received.

14. The conflict detection unit of claim 10, wherein the control unit is configured to combine a coverage mask with coverage mask data read from an entry in the at least one storage resource to produce combined coverage mask data and write the combined coverage mask data to the entry.

15. The conflict detection unit of claim 10, further comprising a timestamp unit configured to maintain a timestamp.

16. The conflict detection unit of claim 15, wherein the control unit is configured to copy the timestamp from the timestamp unit to an entry in the at least one storage resource.

17. The conflict detection unit of claim 10, further comprising a read interface configured to read data from at least one buffer.

18. The conflict detection unit of claim 10, further comprising a fragment processing unit configured to receive fragments produced by rasterizing graphics primitives, each fragment associated with a position, and the data read from the at least one buffer and generate processed fragments.

19. The conflict detection unit of claim 18, further comprising a write interface configured to write the processed fragments to the one or more buffers.

* * * * *